United States Patent
Lu et al.

(10) Patent No.: US 11,303,326 B2
(45) Date of Patent: Apr. 12, 2022

(54) METHOD AND APPARATUS FOR HANDLING ANTENNA SIGNALS FOR TRANSMISSION BETWEEN A BASE UNIT AND A REMOTE UNIT OF A BASE STATION SYSTEM

(71) Applicant: Telefonaktiebolaget LM Ericsson (publ), Stockholm (SE)

(72) Inventors: Chenguang Lu, Sollentuna (SE); Jacob Österling, Järfälla (SE); Miguel Berg, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/978,817

(22) PCT Filed: Mar. 8, 2018

(86) PCT No.: PCT/SE2018/050219
§ 371 (c)(1),
(2) Date: Sep. 8, 2020

(87) PCT Pub. No.: WO2019/172811
PCT Pub. Date: Sep. 12, 2019

(65) Prior Publication Data
US 2021/0050884 A1 Feb. 18, 2021

(51) Int. Cl.
*H04B 7/024* (2017.01)
*H04B 7/06* (2006.01)

(52) U.S. Cl.
CPC .......... *H04B 7/024* (2013.01); *H04B 7/0617* (2013.01)

(58) Field of Classification Search
CPC ...... H04B 7/024; H04B 7/0617; H04B 7/022; H04W 88/085
See application file for complete search history.

(56) References Cited

U.S. PATENT DOCUMENTS 5,048,059 A * 9/1991 Dent ................. H04L 27/38
375/340
6,215,828 B1 * 4/2001 Signell .................. H04L 5/06
375/316

(Continued)

FOREIGN PATENT DOCUMENTS

EP 3466007 B1 * 3/2020 ......... H04L 27/2627
WO 2018004409 A1 1/2018
(Continued)

OTHER PUBLICATIONS

3GPP New Radio Acess Technology—Radio access architecture and interfaces, TR 38801, Rel. 14, 2017.*
(Continued)

*Primary Examiner* — Berhanu Tadese
(74) *Attorney, Agent, or Firm* — Withrow & Terranova, PLLC

(57) ABSTRACT

Systems and methods for handling antenna signals are provided. In some embodiments, a method is performed by a first unit for handling antenna signals for transmission over a transmission connection with a second unit of the base station system. The base station system includes a base unit and a remote unit. The remote unit is arranged to transmit the antenna signals wirelessly to, and receive from, one or more wireless communication devices. The antenna signals each include a plurality of In-phase and Quadrature (IQ) samples. The first unit is the base unit and the second unit is the remote unit, or the first unit is the remote unit and the second unit is the base unit. In this way, quantization errors may typically add incoherently, i.e., adding quantization error power. Also, this may allow cancellation of quantization errors in certain directions depending on transformation type and transformation values.

20 Claims, 11 Drawing Sheets

(56) References Cited

U.S. PATENT DOCUMENTS

| | | | | |
|---|---|---|---|---|
| 6,546,061 | B2* | 4/2003 | Signell | H03H 17/0202 375/316 |
| 6,611,569 | B1* | 8/2003 | Schier | H03D 7/166 375/322 |
| 7,932,790 | B2* | 4/2011 | Rexberg | H03F 3/24 332/109 |
| 8,213,368 | B2* | 7/2012 | Hui | H04L 1/0029 370/329 |
| 8,483,202 | B2* | 7/2013 | Skyman | G06F 17/142 370/343 |
| 9,444,526 | B2* | 9/2016 | Hoymann | H04W 80/04 |
| 9,491,715 | B2* | 11/2016 | Wigren | H04B 17/345 |
| 9,495,971 | B2* | 11/2016 | Ullberg | G10L 19/025 |
| 9,509,385 | B2 | 11/2016 | Gustavsson et al. | |
| 9,628,139 | B2* | 4/2017 | Agata | H04W 72/0453 |
| 10,045,324 | B2* | 8/2018 | Zaidi | G01S 5/0236 |
| 10,484,059 | B2* | 11/2019 | Faxer | H04B 7/066 |
| 10,505,600 | B2* | 12/2019 | Faxer | H04B 7/0617 |
| 10,991,376 | B2* | 4/2021 | Svedberg | G10L 19/06 |
| 11,082,997 | B2* | 8/2021 | Barabell | H04W 72/1263 |
| 2008/0170795 | A1* | 7/2008 | Akenine-Moller | G06T 9/001 382/238 |
| 2010/0241437 | A1* | 9/2010 | Taleb | G10L 19/028 704/500 |
| 2011/0176532 | A1* | 7/2011 | Franceschini | H04L 5/0085 370/342 |
| 2011/0282656 | A1* | 11/2011 | Grancharov | G10L 19/26 704/203 |
| 2014/0219267 | A1* | 8/2014 | Eyuboglu | H04W 56/001 370/350 |
| 2015/0071220 | A1* | 3/2015 | Luo | H04L 5/001 370/329 |
| 2016/0037550 | A1* | 2/2016 | Barabell | H04W 72/046 455/450 |
| 2016/0309347 | A1* | 10/2016 | Eyuboglu | H04W 74/0833 |
| 2018/0164406 | A1* | 6/2018 | Culkin | G01S 13/522 |
| 2018/0175949 | A1* | 6/2018 | Rao | H04W 24/10 |
| 2018/0278934 | A1* | 9/2018 | Andersson | H04N 19/186 |
| 2019/0238866 | A1* | 8/2019 | Strom | G09G 5/06 |
| 2019/0357232 | A1* | 11/2019 | Raghothaman | H04W 52/243 |
| 2020/0077090 | A1* | 3/2020 | Wennersten | H04N 19/124 |
| 2020/0077304 | A1* | 3/2020 | Sandberg | H04W 28/22 |
| 2020/0260524 | A1* | 8/2020 | Kim | H04W 28/06 |
| 2021/0029369 | A1* | 1/2021 | Sjoberg | H04N 19/40 |

FOREIGN PATENT DOCUMENTS

| | | | | |
|---|---|---|---|---|
| WO | WO-2018106155 | A1* | 6/2018 | G06N 5/02 |
| WO | WO-2019125241 | A1* | 6/2019 | H04L 27/36 |
| WO | WO-2019172811 | A1* | 9/2019 | H04B 7/0617 |

OTHER PUBLICATIONS

Alimi et al, Toward an Efficient C-RAN Optical Fronthaul for the Future Networks_ A Tutorial on Technologies, Requirements, Challenges, and Solutions, IEEE 2017.*

Functional Splits_ the foundation of an Open 5G RAN—5G Technology World, by Olli Ander, Benetel May 2021 (Internet Citation from www.5gtechonologyworld.com, retrieved on Aug. 15, 2021).*

Choi, Jinseok, et al., "Space-Time Fronthaul Compression of Complex Baseband Uplink LTE Signals," ICC Signal Processing for Communications Symposium, IEEE, 2016, 6 pages.

Nanba, Shinobu, et al., "A New IQ Data Compression Scheme for Front-haul Link in Centralized RAN," 24th International Symposium on Personal, Indoor and Mobile Radio Communications: Workshop on Cooperative and Heterogenous Cellular Networks, IEEE, 2013, 5 pages.

International Search Report and Written Opinion for International Patent Application No. PCT/SE2018/050219, dated Nov. 26, 2018, 11 pages.

* cited by examiner

METHOD AND APPARATUS FOR HANDLING ANTENNA SIGNALS FOR TRANSMISSION BETWEEN A BASE UNIT AND A REMOTE UNIT OF A BASE STATION SYSTEM

This application is a 35 U.S.C. § 371 national phase filing of International Application No. PCT/SE2018/050219, filed Mar. 8, 2018, the disclosure of which is incorporated herein by reference in its entirety.

TECHNICAL FIELD

The present disclosure relates generally to methods and units for handling antenna signals for transmission over a transmission connection between a base unit and a remote unit of a base station system. The present disclosure further relates to computer programs and carriers corresponding to the above methods and units.

BACKGROUND

In a distributed base station system, radio access network, RAN, processing is conducted by at least two separate units: a remote radio unit, aka radio unit, and a base band unit, aka base unit. The base unit is connected to the radio unit via a fronthaul link. The radio unit is connected to one or more antennas through which the radio unit wirelessly communicates with at least one wireless communication device. The base unit is in its turn connected to other base station systems or base stations, and to a core network of a wireless communication system. The base unit is centralized and there may be more than one radio unit connected to each base unit. The base unit performs advanced radio coordination features such as joint detection, joint decoding, coordinated multi-point transmission, CoMP, to increase the spectrum efficiency and network capacity, as well as baseband processing, whereas the radio units perform radio frequency, RF, processing and transmission/reception of the RF processed signals.

Originally, the radio unit was designed to reduce the cable loss of the coaxial cables between an antenna tower top where the actual antennas are situated and the bottom of the antenna tower where the base station functionality is hosted. Therefore, before $5^{th}$ Generation of mobile communication, 5G, i.e. at 4G, e.g. Long Term Evolution, LTE, the radio unit was rather simple and was mainly doing RF processing with limited baseband processing, if any.

When going from 4G to 5G, there is a need to increase the wireless communication capacity towards the UEs in order to be able to deliver requested data amounts per time period in 5G. One enabler of the mobile evolution towards 5G is massive Multiple Input Multiple Output, MIMO, in which each radio unit has a plurality of antennas. Massive MIMO exploits spatial multiplexing to improve spectrum efficiency by using arrays of active antennas. Active antenna arrays with large number of antennas give many degrees of freedom for beamforming and the increased directivity allows longer reach or communication using less transmit power. The radio unit is equipped with N antennas simultaneously serving K user-layers in the same time-frequency resource. The typical scenario is N>>K. e.g., N is 64, 128 or 256 while K is 8 or 16. As shown, the number of antennas N is quite large. To support such massive MIMO solutions, the required fronthaul link capacity needs to be increased in proportion to the increase of number of antennas, when using the current PHY-RF split between functionality of base unit and radio unit. This will dramatically drive up the fronthaul link costs. In order to lower the amount of data needed to be sent over the fronthaul link, different compression techniques are used, such as quantization with fewer bits.

FIG. 1 shows an example of a block diagram for functionality for downlink communication. The functionality is distributed into coding and modulation functionality 22, beamforming functionality 24, Inverse Fast Fourier Transformation (IFFT) and cyclic prefix (CP) functionality 26, and Radio Frequency (RF) front end functionality 28. K user signals are received at the coding and modulation functionality 22, which K user layer signals are coded and modulated. In the following beamforming functionality 24, the K user layer signals are rearranged into N antenna signals, aka data streams, one signal per antenna. The N antenna signals are arranged so that when they are transmitted wirelessly they together form beams directed towards the wireless communication devices in the cell, i.e. beamforming. Thereafter, the N antenna signals are transformed from frequency domain into time domain in the IFFT and CP functionality 26. The N time domain signals are thereafter transformed from base band frequency into radio frequency in the RF front end functionality 28, before the N RF signals are transmitted wirelessly from the N antennas 30. If the functional split between base unit and radio unit is performed before beamforming, i.e. the beamforming functionality 24 is in the radio unit, the bit rate scales with the number of user layers K. On the other hand, if the functional split is after beamforming, i.e. the beamforming functionality 24 is in the base unit, the bit rate scales with the number of antennas N. Consequently, the bit rate needed to be sent over the fronthaul link if the split is performed after beamforming is higher than if the split is performed before beamforming. Thus, in the latter case the fronthaul link needs to have high capacity. Despite the higher bit rate needed for splits after beamforming, such splits are still of interest as they require lower processing complexity in the radio units, i.e. more cost-efficient radio units. In FIG. 1, two different options are shown for where to split the downlink communication functionality between the base unit and the radio unit after beamforming. According to split option 7-1 (also called Intra-PHY split), the functional split between base unit and radio unit is performed between the beamforming functionality 24 and the IFFT and CP functionality 26. According to split option 8 (also called PHY-RF split), the functional split between base unit and radio unit is performed between the IFFT and CP functionality 26 and the RF front end functionality 28. Split option 7-1 carries N signals comprising frequency domain IQ samples across the fronthaul link whereas split option 8 carries N signals comprising time domain IQ samples across the fronthaul link.

In order to lower the bit rate needed to be sent over the fronthaul link, lossy compression techniques, such as quantization with fewer bits, can be used at the cost of reduced signal quality. For example for split option 8, this could be realized by inserting a quantizer and a de-quantizer in between the IFFT and CP functionality 26 and the RF front end functionality 28, the quantizer being arranged in the base unit and the de-quantizer being arranged at the radio unit. In other words, the quantizer and the de-quantizer will be arranged at different sides of the fronthaul link. As the quantizer quantizes the IQ samples of the N signals with fewer bits as was used before the quantization, a lower bit rate is used over the fronthaul. The de-quantizer then preferably de-quantizes the quantized signal back to the original amount of bits again, however another bit rate may be used than the original bit rate after de-quantizing.

As explained, for the option 7-1 and option 8 splits, and for other splits with one signal per antenna, it might be desirable to reduce the number of quantizer bits substantially in order to decrease bit rate over the fronthaul. As the number of bits are reduced, noise occurring due to the decrease of bits will be added to the signals, so called quantization noise. However, especially for the case of a single wireless communication device in Line of Sight (LOS), i.e. only one active wireless communication device in the cell (or sector), which device is in LOS, the signals to the different elements in an antenna array might be highly correlated. An extreme case is a single user with perfect LOS in the boresight direction, which will result in identical signals on all the antennas. For a fronthaul interface with quantized antenna signals, this means that the quantization noise will also be highly correlated and so the quantization noise from the different antenna signals will add constructively in the direction toward the single wireless communication device. The result is that the Signal-to-Quantization-Noise-Ratio (SQNR) for the whole array will be the same as for a single antenna. In other words, there is no array gain for the combined signal with respect to quantization noise in this case, since quantization noise is beamformed just like the wanted signal. This puts unnecessarily high requirements on the quantization of each antenna signal, leading to high complexity and high bitrates over the fronthaul. An example of the problem is shown in FIGS. 2a and 2b for a case with a 16-element uniform linear array with half-wavelength element spacing, where SQNR is measured for the whole array in the main lobe direction with only one wireless communication device in the boresight. Here a 6 bit quantization is performed of the original 15 bit antenna signals, i.e. the 15 bit per I and per Q sample is limited into 6 bits per I and per Q sample. As can be seen, there is a large spread of SQNR values; the median is about 40.7 dB while the minimum is only about 31 dB, which corresponds to the per-element SQNR. The SQNR at the peaks (43 dB) correspond to the full array gain of 10 $\text{Log}_{10}(16)$=12 dB above the per-element SQNR. FIG. 2a shows that there is a dip of SQNR of 31 dB at pointing directions 0, +/−30 and +/−90 degrees, which is not higher than the per-antenna SQNR. FIG. 2b shows the cumulative distribution function of SQNR for the same example.

A similar problem can also occur for digital beamforming in uplink. For weak uplink signals, the receiver noise will decorrelate the quantization noise but for strong uplink signals, the receiver noise might be much weaker than the quantization noise and the problem of correlated quantization noise might occur.

Magnitude tapering of the array, as is sometimes employed to reduce spatial sidelobes for antenna arrays, could also partially mitigate the problem of correlated quantization noise, but tapering is not always desirable since it leads to power and/or efficiency loss for the array. Magnitude tapering also increases the width of the main lobe, which decreases the angular resolution of the array.

Apart from insufficient SQNR in the main lobe direction, the single-user LOS case can experience a "resonant" phenomenon for certain pointing directions where quantization noise peaks become very strong in other directions than the main lobe. An example is shown in FIG. 3 for a 16 antenna array where the beam is pointing towards +48.6° but there is an additional quantization noise peak at −14.5°. Under certain conditions the additional peak could even be stronger than the side lobes of the beamformed signal, but this is not the case in this example.

Consequently, there is a need for a solution for increasing the SQNR for wireless signals sent uplink or downlink between a wireless communication device and a remote unit of a base station system, wherein the quantization noise occurs due to quantization of antenna signals at a fronthaul link between the remote unit and a base unit of a base station system.

SUMMARY

It is an object of the invention to address at least some of the problems and issues outlined above. It is possible to achieve these objects and others by using a method and an apparatus as defined in the attached independent claims.

According to one aspect, a method is provided, performed by a first unit of a base station system of a wireless communication network, for handling antenna signals for transmission over a transmission connection between the first unit and a second unit of the base station system. The base station system comprises a base unit and a remote unit, wherein the remote unit is arranged to transmit wireless signals to, and receive from, one or more wireless communication devices. The antenna signals each comprises a plurality of IQ samples. Either the first unit is the base unit and the second unit is the remote unit, or the first unit is the remote unit and the second unit is the base unit. The method comprises receiving IQ samples of a first antenna signal related to wireless communication of a first antenna of the remote unit, and receiving IQ samples of a second antenna signal related to wireless communication of a second antenna of the remote unit. The method further comprises transforming the received IQ samples of the first antenna signal into transformed IQ samples, using a first transformation value, and transforming the received IQ samples of the second antenna signal into transformed IQ samples, using a second transformation value, wherein the second transformation value is different from the first transformation value. The method further comprises quantizing the transformed IQ samples of the first antenna signal using fewer bits than a first number of bits used for the received IQ samples of the first antenna signal, and quantizing the transformed IQ samples of the second antenna signal using fewer bits than a second number of bits used for the received IQ samples of the second antenna signal. The method then comprises transmitting the quantized and transformed IQ samples of the first and the second antenna signal over the transmission connection to the second unit for subsequent de-quantizing and re-transforming of the quantized and transformed IQ samples of the first and the second antenna signal into the received IQ samples at the second unit.

According to another aspect, a method is provided, performed by a second unit of a base station system of a wireless communication network, for handling antenna signals for transmission over a transmission connection between the second unit and a first unit of the base station system. The base station system comprises a base unit and a remote unit. The remote unit is arranged to transmit wireless signals to, and receive from, wireless communication devices. The antenna signals each comprises a plurality of IQ samples. Either, the first unit is the base unit and the second unit is the remote unit, or the first unit is the remote unit and the second unit is the base unit. The method comprises receiving, from the first unit, IQ samples of a first antenna signal related to wireless communication of a first antenna of the remote unit, wherein the received IQ samples have been transformed using a first transformation value and the transformed IQ samples have been quantized. The method further comprises receiving, from the first unit, IQ samples of a second antenna signal related to wireless communication of a second antenna of the remote unit, wherein the received IQ samples of the second antenna signal have been transformed using a second transformation value and the transformed IQ samples have been quantized, the second transformation value being different from the first transformation value. The method further comprises de-quantizing the received IQ samples of the first antenna signal to a format using more bits than a number of bits used for the quantized IQ samples of the received first antenna signal, and de-quantizing the received IQ samples of the second antenna signal to a format using more bits than a number of bits used for the quantized IQ samples of the received second antenna signal. The method further comprises re-transforming the de-quantized IQ samples of the first antenna signal using the inverse of the first transformation value, and re-transforming the de-quantized IQ samples of the second antenna signal using the inverse of the second transformation value.

According to another aspect, a first unit is provided, operable in a base station system of a wireless communication network, for handling antenna signals for transmission over a transmission connection between the first unit and a second unit of the base station system. The base station system comprises a base unit and a remote unit. The remote unit is arranged to transmit the antenna signals wirelessly to, and receive from, one or more wireless communication devices. The antenna signals each comprises a plurality of IQ samples. The first unit is the base unit and the second unit is the remote unit. Alternatively, the first unit is the remote unit and the second unit is the base unit. The first unit comprises a processing circuitry and a memory. Said memory contains instructions executable by said processing circuitry, whereby the first unit is operative for receiving IQ samples of a first antenna signal related to wireless communication of a first antenna of the remote unit, and receiving IQ samples of a second antenna signal related to wireless communication of a second antenna of the remote unit. The first unit is further operative for transforming the received IQ samples of the first antenna signal into transformed IQ samples, using a first transformation value, and transforming the received IQ samples of the second antenna signal into transformed IQ samples, using a second transformation value, the second transformation value being different from the first transformation value. The first unit is further operative for quantizing the transformed IQ samples of the first antenna signal using fewer bits than a first number of bits used for the received IQ samples of the first antenna signal, and quantizing the transformed IQ samples of the second antenna signal using fewer bits than a second number of bits used for the received IQ samples of the second antenna signal. The first unit is further operative for transmitting the quantized and transformed IQ samples of the first and the second antenna signal over the transmission connection to the second unit for subsequent de-quantizing and re-transforming of the quantized and transformed IQ samples of the first and the second antenna signal into the received IQ samples at the second unit.

According to another aspect, a second unit is provided, operable in a base station system, for handling antenna signals for transmission over a transmission connection between the second unit and a first unit of the base station system. The base station system comprises a base unit and a remote unit, the remote unit being arranged to transmit wireless signals to, and receive from, wireless communication devices. The antenna signals each comprises a plurality of IQ samples. The first unit is the base unit and the second unit is the remote unit, or alternatively the first unit is the remote unit and the second unit is the base unit. The second unit comprises a processing circuitry and a memory. Said memory contains instructions executable by said processing circuitry, whereby the second unit is operative for receiving, from the first unit, IQ samples of a first antenna signal related to wireless communication of a first antenna of the remote unit, wherein the received IQ samples have been transformed using a first transformation value and the transformed IQ samples have been quantized, and receiving, from the first unit, IQ samples of a second antenna signal related to wireless communication of a second antenna of the remote unit, wherein the received IQ samples of the second antenna signal have been transformed using a second transformation value and the transformed IQ samples have been quantized, the second transformation value being different from the first transformation value. The second unit is further operative for de-quantizing the received IQ samples of the first antenna signal to a format using more bits than a number of bits used for the quantized IQ samples of the received first antenna signal, and de-quantizing the received IQ samples of the second antenna signal to a format using more bits than a number of bits used for the quantized IQ samples of the received second antenna signal. The second unit is further operative for re-transform ing the de-quantized IQ samples of the first antenna signal using the inverse of the first transformation value, and re-transforming the de-quantized IQ samples of the second antenna signal using the inverse of the second transformation value.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which:

FIG. 2b is a Cartesian coordinate system showing a Cumulative Distribution Function (CDF) of the SQNR of FIG. 2a.

FIG. 10b is a Cartesian coordinate system showing a Cumulative Distribution Function (CDF) of the SQNR of FIG. 10a.

FIG. 11 is a Cartesian coordinate system showing signal magnitude as a function of viewing angle for signal and quantization noise according to the embodiment of FIG. 10a.

DETAILED DESCRIPTION

Figure 4:
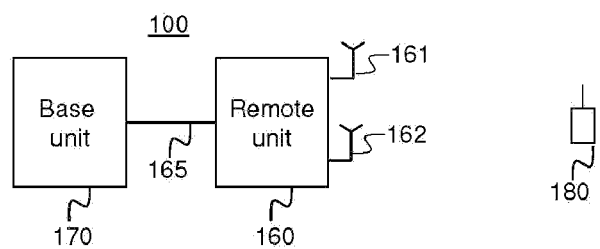
FIG. 4 is a schematic block diagram illustrating a base station system in which the present invention may be used.

FIG. 4 shows a base station system 100 of a wireless communication network. The base station system comprises a base unit 170, and a remote unit 160 connected via a transmission connection 165 to the base unit. The transmission connection 165 may be a point-to-point transmission link between the base unit and the remote unit, e.g. a physical transmission line, such as a copper cable or an optical cable or a point-to-point wireless connection. Alternatively, the transmission connection 165 may be any kind of transmission network connecting the base unit with the remote unit, such as an Ethernet network. The transmission network may comprise microwave or millimeter wave links, optical links or electrical conductor links, e.g. metallic conductor links such as copper-based links. The transmission network may also be a wireless meshed network. The transmission network may comprise network switches and/or routers that performs the switching of signals sent over the links of the transmission network between the base unit and the remote unit. The remote unit 160 is in its turn connected to two or more antennas 161, 162, through which the remote unit transmits wireless signals to and receives wireless signals from wireless communication devices 180. The base unit is normally connected to a plurality of remote units that may or may not use the same transmission connection for connection to the base unit. The base unit 170 of the base station system is in its turn, when connected to a wireless communication network, connected to other nodes of the network, such as other base stations, network controlling nodes etc. in a regular way for base stations in wireless communication networks. The wireless communication network may be based on any kind of technology such as 5G New Radio (NR), Long Term Evolution (LTE), Wideband Code Division Multiple Access (W-CDMA), Global System for Mobile communication (GSM), etc.

Figure 5:
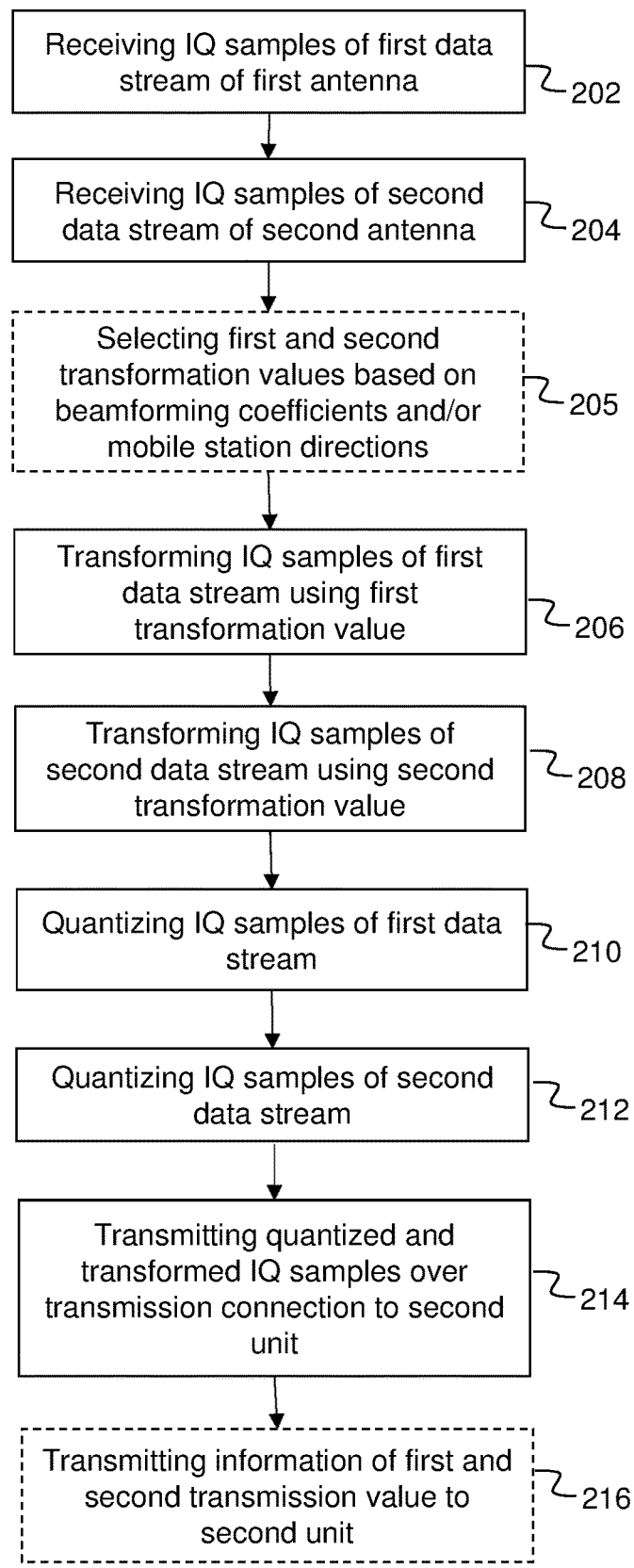
FIG. 5 is a flow chart illustrating a method performed by a first node, according to possible embodiments.

FIG. 5, in conjunction with FIG. 4, describes a method performed by a first unit of a base station system 100 of a wireless communication network, for handling antenna signals for transmission over a transmission connection 165 between the first unit and a second unit of the base station system. The base station system comprises a base unit 170 and a remote unit 160, wherein the remote unit 160 is arranged to transmit wireless signals to, and receive from, one or more wireless communication devices 180. The antenna signals each comprises a plurality of IQ samples. Either the first unit is the base unit 170 and the second unit is the remote unit 160, or the first unit is the remote unit 160 and the second unit is the base unit 170. The method comprises receiving 202 IQ samples of a first antenna signal related to wireless communication of a first antenna 161 of the remote unit 160, and receiving 204 IQ samples of a second antenna signal related to wireless communication of a second antenna 162 of the remote unit 160. The method further comprises transforming 206 the received IQ samples of the first antenna signal into transformed IQ samples, using a first transformation value, and transforming 208 the received IQ samples of the second antenna signal into transformed IQ samples, using a second transformation value, wherein the second transformation value is different from the first transformation value. The method further comprises quantizing 210 the transformed IQ samples of the first antenna signal using fewer bits than a first number of bits used for the received IQ samples of the first antenna signal, and quantizing 212 the transformed IQ samples of the second antenna signal using fewer bits than a second number of bits used for the received IQ samples of the second antenna signal. The method then comprises transmitting 214 the quantized and transformed IQ samples of the first and the second antenna signal over the transmission connection 165 to the second unit for subsequent de-quantizing and re-transforming of the quantized and transformed IQ samples of the first and the second antenna signal into the received IQ samples at the second unit.

In other words, the received IQ samples of the first antenna signal are transformed into transformed IQ samples using a transformation value different from the transformation value used for transforming the received IQ samples of the second antenna signal. This transformation is performed before quantizing the IQ samples with fewer bits in order to send the quantized IQ samples over the fronthaul connection. As the transformation is performed before quantizing, any systematic error that may occur due to the quantization is added to the transformed IQ samples. As the first and second IQ samples are re-transformed back to as they were before they were transformed, using different re-transformation values, when they are received at the second unit, the systematic quantization error will be spread out differently for the first IQ sample compared to the second IQ sample after re-transformation. As a result, there is no risk, or at least a very small risk of superposition of quantization errors for antenna signals of the first and second antenna when the antenna signals are transmitted wirelessly. In other words, without the invention, quantization error will add coherently, i.e. adding quantization error values, for some beam pointing directions. With the invention, quantization errors will typically add incoherently, i.e. adding quantization error power. Also, embodiments of the invention allows cancellation of quantization errors in certain directions depending on transformation type and transformation values.

An IQ sample is a value in the complex plane, i.e. a complex data value. The first and second transformation values may be complex values, i.e. comprising a real part and an imaginary part. In a special case, the first and second transformation values may be real values. The IQ samples can be expressed in Cartesian format or polar format, for example. An IQ sample is described by a number of bits. An IQ sample received at step 202 and/or step 204 is described by a first number of bits. In the quantization step, the number of bits describing the IQ sample is lowered from the first number of bits to a second number of bits that is lower than the first number of bits, in order to lower the amount of transmission capacity needed for sending the IQ sample across the transmission connection. As less amount of bits are used, a quantization error, aka quantization noise, occurs. An antenna signal comprises a number of consecutive IQ samples. Of course the steps 206 and 208, as well as steps 210 and 212 can be performed in reverse order or in parallel, compared to as defined in the flow chart of FIG. 5.

When the first unit is the base unit 170 and the second unit is the remote unit 160, the first antenna signal is to be transmitted from the base unit to the remote unit, and further wirelessly from the first antenna of the remote unit, i.e. downlink. In the alternative, the first unit is the remote unit 160 and the second unit is the base unit 170. Then the first antenna signal has been received wirelessly by the first antenna and are to be sent by the remote unit to the base unit, i.e. uplink. The same reasoning is applicable to the second antenna signal.

According to an embodiment, the IQ samples of the first antenna signal are transformed 206 by being multiplied with the first transformation value, and the IQ samples of the second antenna signal are transformed 208 by being multiplied with the second transformation value. At the second unit, a corresponding division of the transformed first antenna signal with the first transformation value and a division of the transformed second antenna signal with the second transformation value may be performed, in order to transform the IQ samples of the first and second antenna signal back to their original form that they had when they were received at the first unit. As the transformation values are values in the complex plane, rotation and dilation of the IQ samples of the respective antenna signal can be achieved by multiplication and division. According to an alternative, rotation can be achieved without multiplication using a COordinate Rotation Digital Computer (CORDIC) algorithm, aka Volder's algorithm. The CORDIC algorithm involves addition and shift operations. Typically it is used when hardware multiplication is not available. Rotation may typically be around the origin, (0+0i). Thus, rotation-transformation around the origin would cause the complex sample to move along a circular arc with center in the origin. Rotation around the origin would be the same as a phase change of the IQ samples. An advantage with rotation-transformation is that if rotation by a sufficiently large angle is done, it is not necessary to know the quantization step size. Thus, if quantization step size changes, the transformation value does not have to change. Regarding transformation using dilation, it could have a similar advantage as rotation, i.e. no need to know the quantization step size and it requires only a real multiplication. A disadvantage is that performance drops quickly if we multiply by numbers $\ll 1$, which increases quantization error, or $\gg 1$ which increases clipping.

According to another embodiment, the first transformation value and the second transformation value are real values. Hereby, dilation of the IQ samples of the respective antenna signal is achieved. In other words, the IQ samples are enlarged or reduced in size.

According to yet another embodiment, the first transformation value and the second transformation value are complex values, and the first transformation value is multiplied with the IQ samples of the first antenna signal and the second transformation value is multiplied with the IQ samples of the second antenna signal. Further, the first and second transformation values may have unit magnitude, e.g. magnitude 1. Hereby, the transmitted quantized and transformed IQ samples, when received at the second unit, can be multiplied with the complex conjugate when performing re-transformation at the second unit. Multiplying with the complex conjugate is less computationally complex than performing division of complex values.

According to another embodiment, the IQ samples of the first antenna signal are transformed 206 by being added with the first transformation value, and the IQ samples of the second antenna signal are transformed 208 by being added with the second transformation value. In other words, in this embodiment, different offsets are added to the first antenna signal compared to the second antenna signal. The first and second transformation values may be real values or complex values. By using small offsets based on the quantization step size, a good cancellation of the quantization errors can be achieved without significantly increasing the risk of signal clipping.

According to another embodiment, N number of antenna signals are received 202, 204, and the remote unit has N antennas. Further, antenna signal n, where n=1, . . . , N, is related to wireless communication of antenna n of the remote unit, and the transformation values $a_n$ are selected as the following sequence of transformation values:

$$a_n = \frac{\Delta}{N}\left\{-\frac{N}{2}, -\frac{N-1}{2}, \ldots, +\frac{N-1}{2}\right\} + i\frac{\Delta}{N}\left\{-\frac{N-1}{2}, +\frac{N-2}{2}, \ldots, -\frac{N}{2}\right\}, \text{ where } n = \{1, 2, \ldots, N\},$$

or the transformation values are selected as a circular shift of the sequence of transformation values or as any other permutation of the sequence of transformation values. The permutation of values may be a random permutation of values. The sequence above has equally spaced values between minus one half quantization step and plus one half quantization step, for both I and Q. By such a sequence of transformation values, a dip of quantization errors is achieved at boresight direction of the remote unit for the single wireless communication device LOS case. The above sequence gives a quantization noise dip in one direction. Please observe that there are other sequences that can give dips in other directions. As an example, for the single-user LOS case, a special case where dips are achieved in other directions could be achieved by making sure that the beam is always pointing in the boresight direction before the fronthaul, and then apply beamforming to point it in the correct angle after the fronthaul. The dip would then occur in the direction toward the UE. Since beamforming is usually performed by phase change (rotation) a combination of two transformation schemes can create a dip in any desired direction (at least for the single-device LOS case). Here is a simple example for split 8:

1. Perform beamforming and IFFT+CP. Beam is now pointing towards the wireless communication device.
2. If single-device LOS, perform rotation, i.e. phase change with transformation values so that beam is pointing in boresight direction.
3. Perform transformation by adding $a_n$ values from the sequence mentioned in the formula earlier in the paragraph.
4. Send over fronthaul connection.
5. Perform re-transformation by adding $-a_n$ values, creating a quantization noise dip in boresight direction.

6. If single-user LOS, perform re-transformation by rotating back so that the beam (and the quantization noise dip) is now pointing in the correct angle towards the UE. Further, it is beneficial for the transmission if there is low quantization error in the direction of the wireless communication device, as this results in a high signal to quantization noise ratio (SQNR) in the direction of the wireless communication device.

According to an embodiment, the first transformation value and the second transformation value each comprises a first element and a second element. Further, the IQ samples of the first antenna signal are transformed 206 by being multiplied with the first element of the first transformation value and thereafter being added with the second element of the first transformation value, and the IQ samples of the second antenna signal are transformed 208 by being multiplied with the first element of the second transformation value and thereafter being added with the second element of the second transformation value.

In the first step, performed by multiplication with the first element, rotation transformation, i.e. phase change is performed per antenna. The rotation transformation may be set so that the beamforming is at least approximately compensated for. Then at the second step, performed by addition with the second element, translation is applied with a sequence before quantization. The sequence may be deterministic. The sequence for translation could be the one that gives a quantization noise dip at boresight. For beamforming performed for a single wireless communication device in LOS, the phase difference between antenna elements is a linear slope, which is easy to compensate. If antenna element separation is d*lambda where lambda is the wavelength, and we have a single narrow beam pointing at an angle v from boresight, then the signal phase difference in degrees for adjacent antenna elements is 360*d*sin(v). If e.g. v is 30 degrees, then signal phase changes 90 degrees for each antenna element (e.g. +180, +90, 0, −90, . . . ). A beamforming unit applies opposite phase compared with the channel so to undo the beamforming we would apply the same phase difference as the channel.

According to another embodiment, the method further comprises selecting 205 the first and the second transformation values based on beamforming coefficients and/or directions towards the one or more wireless communication devices 180 wirelessly connected to the remote unit 160, in order to provide a spectral dip for quantization noise towards the one or more wireless communication devices. Hereby, SQNR in directions towards the wireless communication devices can be increased. In this embodiment it is necessary to send the transformation values from the first unit to the second unit, unless the second unit also knows the beamforming coefficients and can determine the transformation values.

According to another embodiment, the method further comprises transmitting 216, to the second unit, information of the first transformation value and of the second transformation value. The second unit needs to know the first and second transformation value in order to be able to re-transform, i.e. transform back, the transformed complex values of the first and second antenna signal into the original complex values. The first and the second transformation values could either be sent from the first unit to the second unit or alternatively they could be preconfigured at the first and second unit. When the transformation values are sent, the first unit could trigger change of transformation values when necessary. In case the transformation values are random values, the transformation values applied need to be sent to the second unit.

According to an alternative to this embodiment, the method further comprises updating over time the first transformation value and the second transformation value in a predefined pattern known by the first unit and the second unit. Hereby, no information need to be transmitted across the transmission connection 165 in order for both the first and the second unit to know the first and second transformation values. Consequently, transmission connection capacity is saved for other use. The first and the second values may be updated e.g. at start of an OFDM symbol, per OFDM symbol, per time slot or per radio frame. An example of updating first and second transformation values according to a predefined pattern is to have a circular shift of transformation values at predefined time points. For example, in case of three antennas, thus being three antenna signals, at time point t0 the first antenna signal has a first transformation value, the second antenna signal has a second transformation value and the third antenna signal has a third transformation value. At time point $t_1$, the first antenna signal starts to be transformed using the third transformation value, the second antenna signal starts to be transformed using the first transformation value and the third antenna signal starts to be transformed using the second transformation value, and so on for the second time point $t_2$, etc.

Figure 6:
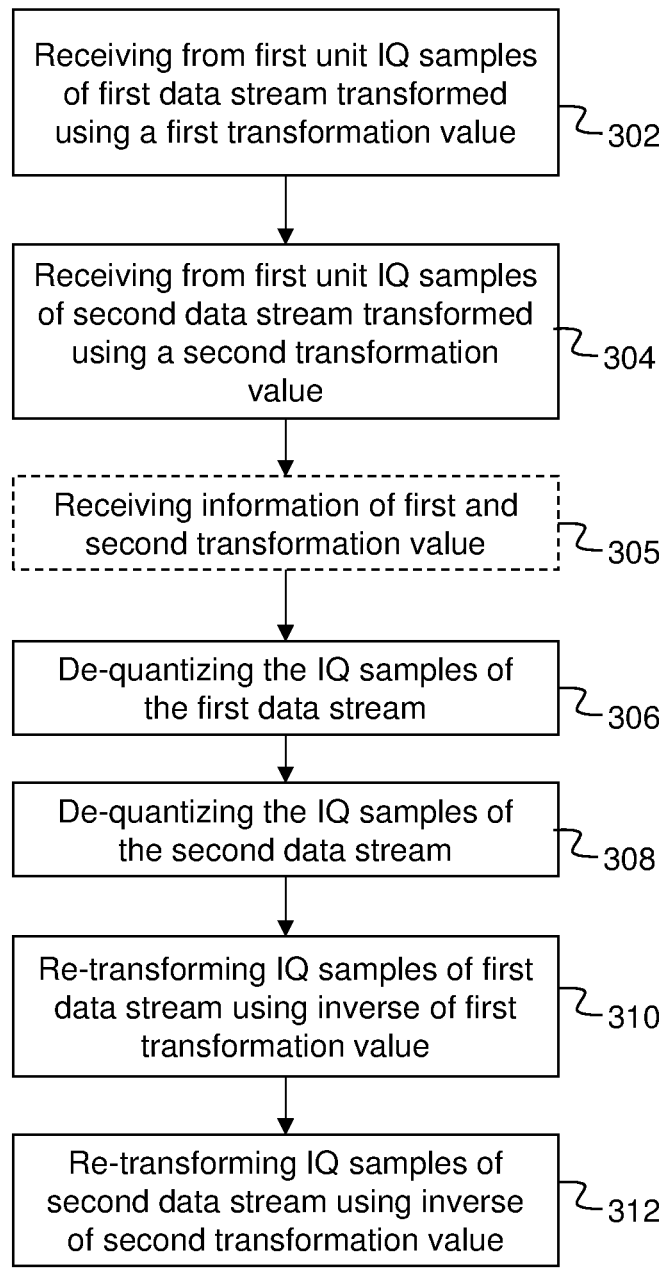
FIG. 6 is a flow chart illustrating a method performed by a second node, according to possible embodiments.

FIG. 6, in conjunction with FIG. 4, describes a method performed by a second unit of a base station system 100 of a wireless communication network, for handling antenna signals for transmission over a transmission connection 165 between the second unit and a first unit of the base station system. The base station system comprises a base unit 170 and a remote unit 160. The remote unit 160 is arranged to transmit wireless signals to, and receive from, wireless communication devices 180. The antenna signals each comprises a plurality of IQ samples. Either, the first unit is the base unit 170 and the second unit is the remote unit 160, or the first unit is the remote unit 160 and the second unit is the base unit 170. The method comprises receiving 302, from the first unit, IQ samples of a first antenna signal related to wireless communication of a first antenna 161 of the remote unit 160, wherein the received IQ samples have been transformed using a first transformation value and the transformed IQ samples have been quantized. The method further comprises receiving 304, from the first unit, IQ samples of a second antenna signal related to wireless communication of a second antenna 162 of the remote unit 160, wherein the received IQ samples of the second antenna signal have been transformed using a second transformation value and the transformed IQ samples have been quantized, the second transformation value being different from the first transformation value. The method further comprises de-quantizing 306 the received IQ samples of the first antenna signal to a format using more bits than a number of bits used for the quantized IQ samples of the received first antenna signal, and de-quantizing 308 the received IQ samples of the second antenna signal to a format using more bits than a number of bits used for the quantized IQ samples of the received second antenna signal. The method further comprises re-transforming 310 the de-quantized IQ samples of the first antenna signal using the inverse of the first transformation value, and re-transforming 312 the de-quantized IQ samples of the second antenna signal using the inverse of the second transformation value.

As the first and second IQ samples are re-transformed back to as they were before they were transformed at the first unit, using mutually different re-transformation values, when they are received at the second unit, after being sent over the transmission connection, the systematic quantization error will be spread out differently for the first IQ sample compared to the second IQ sample after re-transformation. As a result, there is no risk, or at least a very small risk of superposition of quantization errors for antenna signals of the first and second antenna when the antenna signals are transmitted wirelessly. The inverse of the first transformation value is a value that when the transformed IQ samples are re-transformed using this inverse value, the original non-transformed value is achieved again, except for any quantization errors occurring in the quantization and de-quantization steps. In other words, a transformation using the inverse value of an original value, undo the transformation using the original value.

According to an embodiment, the IQ samples of the first antenna signal were transformed by being multiplied with the first transformation value and the IQ samples of the second antenna signal were transformed by being multiplied with the second transformation value. Further, the re-transforming 310 of the de-quantized first antenna signal comprises dividing the IQ samples of the first antenna signal with the first transformation value, and the re-transforming 312 of the de-quantized second antenna signal comprises dividing the IQ samples of the second antenna signal with the second transformation value. The division operation of the re-transformation may in fact be implemented as a multiplication with 1/(the first transformation value) or 1/(the second transformation value, respectively.

According to an embodiment, the first transformation value and the second transformation value are real values.

According to another embodiment, the first transformation value and the second transformation value are complex values, and wherein the re-transforming 310 of the de-quantized first antenna signal comprises multiplying the IQ samples of the first antenna signal with the complex conjugate of the first transformation value, and wherein the re-transforming 312 of the de-quantized second antenna signal comprises multiplying the IQ samples of the second antenna signal with the complex conjugate of the second transformation value.

According to another embodiment, the IQ samples of the first antenna signal were transformed by being added with the first transformation value, and the IQ samples of the second antenna signal were transformed by being added with the second transformation value. Further, the re-transforming 310 of the de-quantized first antenna signal comprises subtracting the IQ samples of the first antenna signal with the first transformation value, and the re-transforming 312 of the de-quantized second antenna signal comprises subtracting the IQ samples of the second antenna signal with the second transformation value.

According to another embodiment, the method further comprises receiving 305, from the first unit, information of the first transformation value and of the second transformation value.

According to another embodiment, the method further comprises updating over time the first transformation value and the second transformation value in a predefined pattern known by the first unit and the second unit.

According to the invention, a solution is provided to the problem of correlated quantization noise for fronthaul with digital beamforming. In the following, a method example of this solution is shown for downlink communication. The method comprises the following steps:

1. At the base unit, before quantization of the IQ samples of the antenna signal n directed to antenna n (wherein n=1 to N), a first transformation is applied to the IQ samples of each antenna signal n. The first transformation is controlled by a first sequence of transformation values $a_n$. The first sequence of transformation values $a_n$ may be constant over many IQ samples of one signal over time, but all values for the different antenna signals cannot be equal, i.e. for at least one value of k where k≠n, we should have $a_k \neq a_n$.

2. Thereafter, the transformed IQ samples of the N antenna signals are quantized with fewer bits than the IQ samples had before transformation, and the resulting quantized antenna signals are sent over the fronthaul link to the remote unit.

3. At the remote unit, the received quantized and transformed IQ samples of the antenna signals N are inverse quantized (aka re-quantized) to a data format with higher resolution, i.e. more significant bits than when they were quantized, for example to the same format as before quantization in the transmitting end.

4. Thereafter, at the remote unit, a second transformation is applied to the N antenna signals, controlled by a second sequence of transformation values $b_n$. Typically, $b_n$ should be designed so that the second transformation is the inverse of the first transformation, e.g. $a_n=1/b_n$ for each value of n, when multiplication is used, and $a_n=-b_n$ when an offset is added. The first and second sequences of values controlling the first and the second transformation may be constant over time or updated on a regular basis, e.g. per OFDM symbol, per slot or per radio frame. The first and second sequences of values may also be updated on demand. By careful design of the transformation as well as the selection of $a_n$ and $b_n$, quantization noise can be spectrally shaped, either spreading quantization noise evenly over all directions or reducing the amount of noise in the direction toward the wireless communication device.

By shaping quantization noise spectrally, worst-case performance for the single-user LOS case is no longer limited to the single-antenna SQNR. After applying the invention, the resulting array SQNR is typically close to the SQNR of the individual signals plus the array gain of 10·log 10(N) in dB.

In the following, an embodiment of the invention is shown for downlink communication, but the invention is applicable in uplink as well.

Figure 1:
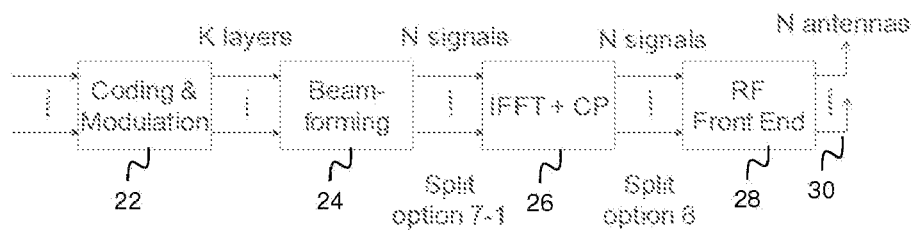
FIG. 1 is a schematic block diagram illustrating two possible functionality splits between a base unit and a remote unit of a base station system, according to the prior art.
Figure 7:
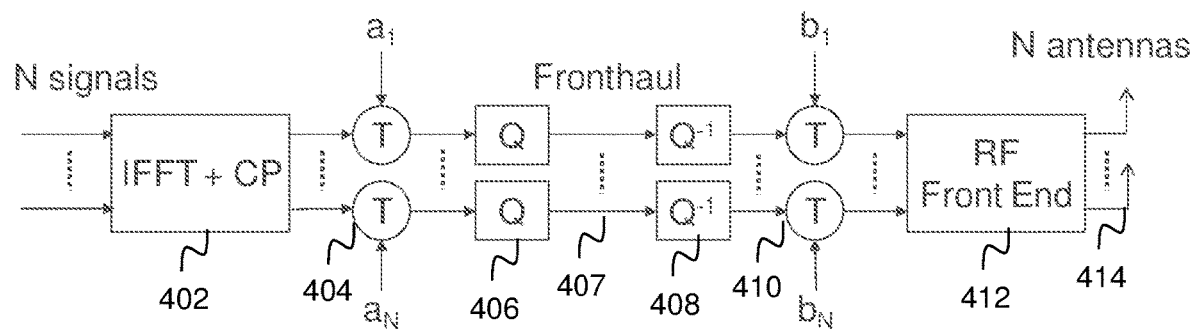
FIGS. 7-8 are schematic block diagrams illustrating embodiments of the invention according to two different functionality splits between a base unit and a remote unit of a base station system.

FIG. 7 describes an embodiment of the invention in which a distributed base station is split according to the split option 8, as described in the background in relation FIG. 1. In other words, here the distributed base station is split so that coding and modulation functionality, beamforming functionality and IFFT and CP functionality 402 is situated at the base unit and the RF front end functionality 412 is situated at the remote unit. Further, a quantizing functionality 406 is situated at the base unit for quantizing the IQ samples of the N antenna signals after the IFFT and CP functionality 402. In between the IFFT and CP functionality 402 and the quantizing functionality 406, a transformation functionality 404 is situated, for transforming the IQ samples of the N antenna signals before they are quantized. The transformation functionality 404 transforms the IQ samples of the N different antenna signals differently so that at least two of the antenna signals have different transformations at the same time point. In other words, in the transformation functionality 404, the IQ samples of the N signals are transformed, as controlled by the sequence $a_n$ (where n=(1, 2, . . . , N)), before the quantizing functionality Q 406 that reduces the number of bits of the IQ samples of each signal.

At the remote unit side, on the opposite side of the fronthaul connection 407 connecting the base unit with the remote unit, there is an inverse quantizing functionality 408 $Q^{-1}$ that de-quantizes the received quantized and transformed IQ samples into more number of bits per IQ sample again. Preferably, the number of bits may become the same as before the quantizing at the quantizing functionality 406. In other words, the N signals are converted back to a representation with a larger number of bits again. Thereafter, there is a re-transformation functionality 410 that transforms the N signals again using the sequence bn before the re-transformed N signals are sent to the RF front end functionality 412 before being transmitted wirelessly from the N antennas. Preferably, bn creates the inverse transformation compared with the transformation created by an since this means that signal number n is largely unaffected while the quantization noise is distributed as desired. If the transformation as well as an and bn are properly selected, the quantization noise will be distributed evenly over the spatial spectrum. It is also possible to select method for the transformations as well as an and bn based on beamforming coefficients and/or on the direction towards the wireless communication devices, in order to provide a spectral dip for quantization noise toward the wireless communication devices. Suitable transformation methods include e.g. geometrical transformations in the complex plane, e.g. rotation around the origin of the complex plane, i.e. changing the phase of the IQ sample without affecting the magnitude, translation, i.e. adding a complex offset to the IQ sample, reflection along an axis, e.g. complex conjugate, changing sign of only the imaginary part and not the real part, or dilation, i.e. changing the magnitude of the IQ sample without changing the phase. The sequence of values a, b of the transformation sequences an and bn may be taken e.g. from deterministic, random or pseudo-random sequences. The sequence of values could be constant over time or changed on a regular basis or on demand.

More advanced transformations are also possible, e.g. combinations of geometrical transformations. If the transformation is a combination of transformations, each $a_n$ and $b_n$ may need to be a vector of values instead of a scalar, e.g. to perform both rotation and translation.

As an example of transformation and inverse transformation, rotation and dilation of the IQ samples can be achieved by complex multiplication. To achieve the inverse, one would then set $b_n=1/a_n$ so that the resulting signal is not distorted. For translation, the relationship becomes $b_n=-a_n$ since translation can be achieved by complex addition. Reflection along the real axis can be accomplished with the complex conjugate and reflection along other axes can be accomplished e.g. by a combination of rotation and complex conjugate operations.

To achieve rotation around the origin of the complex plane, multiplication can be used as the transformation operation at the transformation functionality 404, using $a_n$ values with unit magnitude and a phase according to the desired rotation. In this case, division is not needed to recreate the sequence of IQ samples at the re-transformation functionality 412 but can use the complex conjugate, $b_n=\text{conj}(a_n)$. One example of rotation is random phase rotation, e.g. in the interval $$]-\frac{\pi}{4}, \frac{\pi}{4}[.$$

The phase interval is not critical, which means that there are many other phase intervals giving good performance as long as the interval is not too small. From Taylor expansion of the rotation operation, it can be shown that the length of the phase interval in radians should not be smaller than the quantization step size divided by the root mean square value of the signal in order to be efficient. Above a certain interval width, performance does not change much. By selecting a sufficiently large interval such as $$]-\frac{\pi}{4}, \frac{\pi}{4}[,$$

it is not necessary to have any information about the quantization step size, which might be an advantage.

An example of dilation (resizing) is by using multiplication of the IQ samples with real values. I.e., the $a_n$ values have zero phase but amplitude variation of e.g. [−3, +3] dB. The amplitude variation may be random. Such transformation will partially mitigate the problem of correlated quantization noise but suffers from a similar problem as magnitude tapering of arrays, i.e. loss of power and/or efficiency.

An example of translation is to add an offset to the IQ values of each N signals in the transformation functionality 404, i.e. before quantization, and then subtract the offset in the re-transformation functionality 412. For large offsets, there is a risk of clipping in the quantizer but this could be handled if translation is performed with modulo arithmetic. If a random offset is used, it could be e.g. in the interval $$\left[-\frac{\Delta}{2}, +\frac{\Delta}{2}\right]$$

as with dithering, but as opposed to dithering, the random offset could remain constant for many samples, and would be subtracted in the re-transformation functionality 412. An example of a deterministic offset is when the offset for the different antenna elements is chosen as a staircase, e.g. over the semi-open interval $$\left[-\frac{\Delta}{2}, +\frac{\Delta}{2}\right[,$$

i.e. signal 1 will get an offset of $$-\frac{\Delta}{2}$$

and signal N will get an offset slightly smaller than $$+\frac{\Delta}{2}.$$

The real and imaginary part of the same IQ sample could use the same offset or different offsets. In order to create a deep quantization noise dip in boresight direction, the offset for the real part could be such a staircase, while the offset for the imaginary part could be the same staircase in reverse order and with the sign flipped, e.g. as follows $$a_n = \frac{\Delta}{2}\left\{-\frac{N}{2}, -\frac{N-1}{2}, \ldots, +\frac{N-1}{2}\right\} + i\frac{\Delta}{2}\left\{+\frac{N-1}{2}, +\frac{N-2}{2}, \ldots, -\frac{N}{2}\right\},$$

where n = {1, 2, ... , N}.

Another example of deterministic translation is to select equally spaced points on a circle in the complex plane having radius $$\frac{\Delta}{2}$$

for the IQ samples of different antenna signals.

It should be noted that in a practical implementation, other operations such as dithering or amplitude tapering could be included in either $a_n$ or $b_n$ if desired, e.g. in order to reduce the total number of arithmetic operations. In this case, the second transformation might not achieve the inverse of the first transformation.

Figure 8:
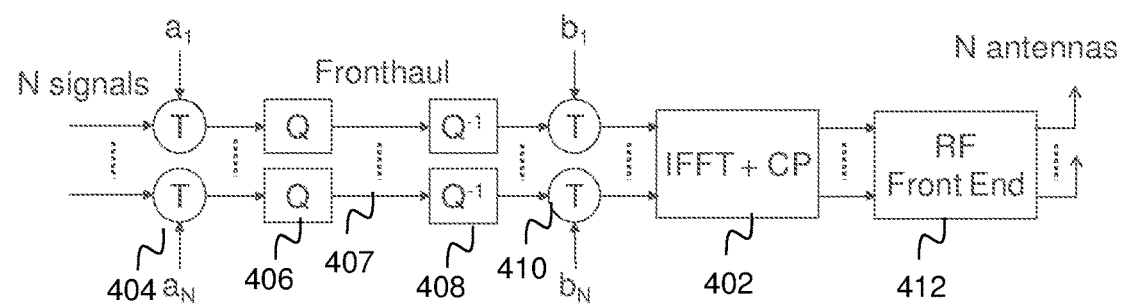

FIG. 8 shows an embodiment of the invention for an intra-PHY split, option 7-1 (see FIG. 1). Here the distributed base station is split so that the beamforming functionality is still at the base unit but the IFFT and CP functionality 402 as well as the RF front end functionality 412 is at the remote unit. Consequently, the inverse quantizing functionality 408 and the re-transformation functionality 410 is situated before the IFFT and CP functionality 402 in the downlink signal direction at the remote unit. Further, the same type of transformations as for the option 8 PHY-RF split can be applied in this case.

A numerical analysis has been performed to compare the results without and with an example embodiment of the invention. A 16-antenna element uniform linear array of antennas with half-wavelength element spacing is used. Perfect Line-of-Sight (LOS) beamforming is assumed and the antenna weights are calculated to point towards the wireless communication device. Without the invention, the spectral shape of the quantization noise varies significantly depending on the beam pointing direction. A single user layer signal is transmitted, consisting of a 20 MHz LTE downlink signal. The signal to each antenna element is quantized with a 6-bit uniform quantizer, from 15 bits down to 6 bits. Throughout the simulation, which is 1 Transmission Time Interval (TTI) long, the sequence of values an and bn controlling the transformations for signal n is kept constant.

Figure 2A:
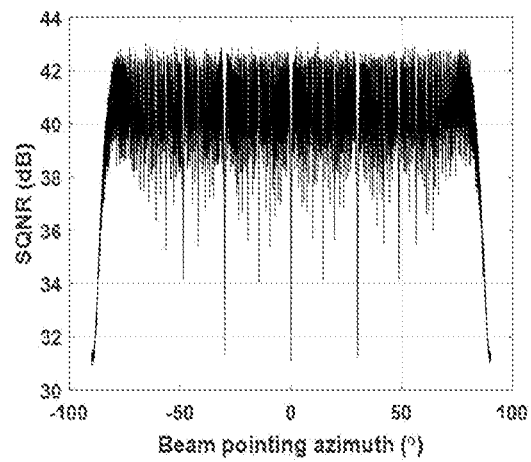
FIG. 2a is a Cartesian coordinate system showing SQNR as a function of beam angle using a method according to prior art, wherein viewing angle equals beam angle.
Figure 2B:
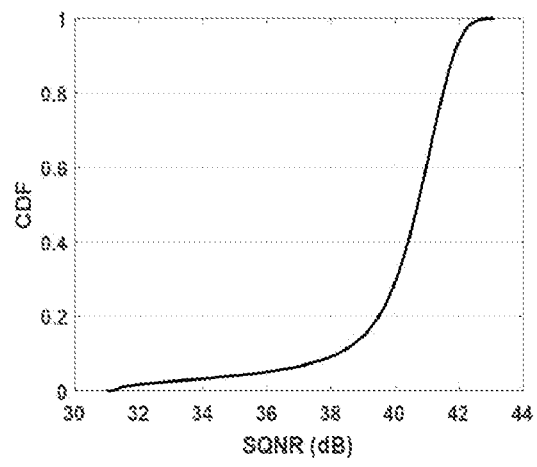
Figure 3:
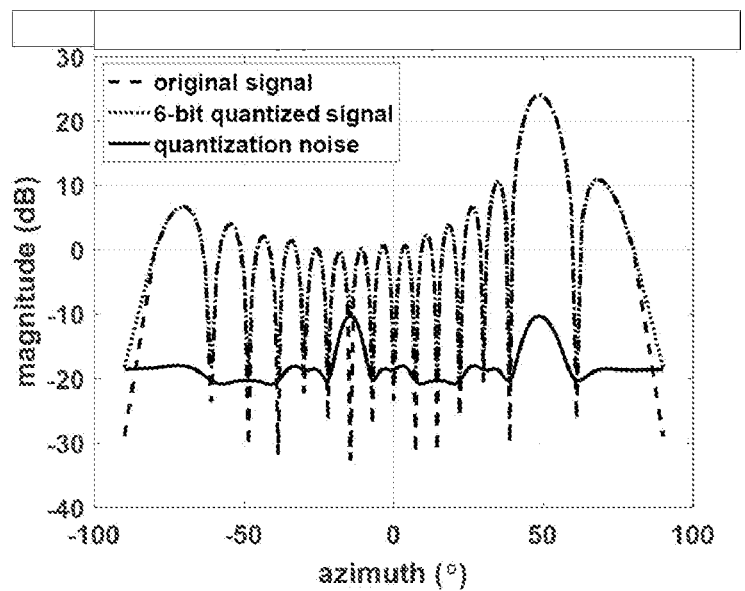
FIG. 3 is a Cartesian coordinate system showing signal magnitude as a function of different viewing angles for signal and quantization noise using a prior art method.
Figure 9:
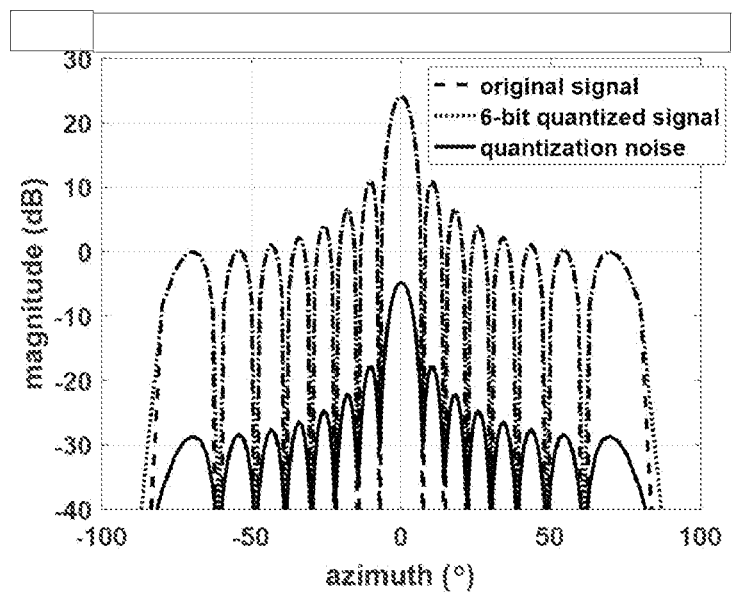
FIG. 9 is a Cartesian coordinate system showing signal magnitude as a function of viewing angle for signal and quantization noise using prior art.
Figure 10A:
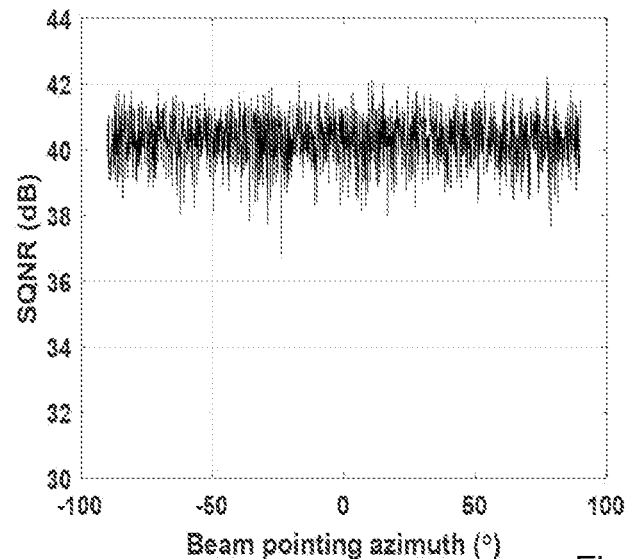
FIG. 10a is a Cartesian coordinate system showing SQNR as a function of viewing angle using an embodiment of the invention, wherein viewing angle equals beam angle.
Figure 10B:
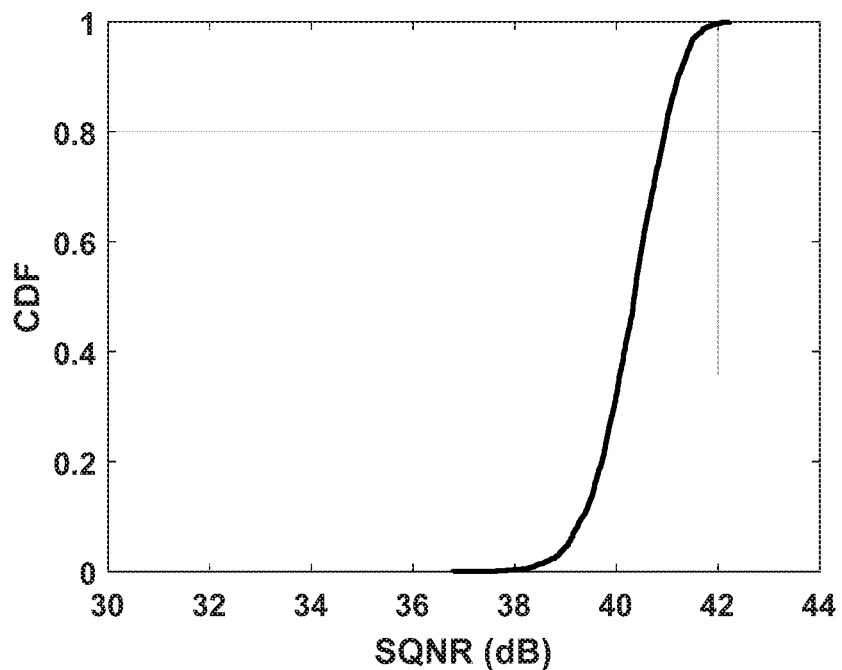
Figure 11:
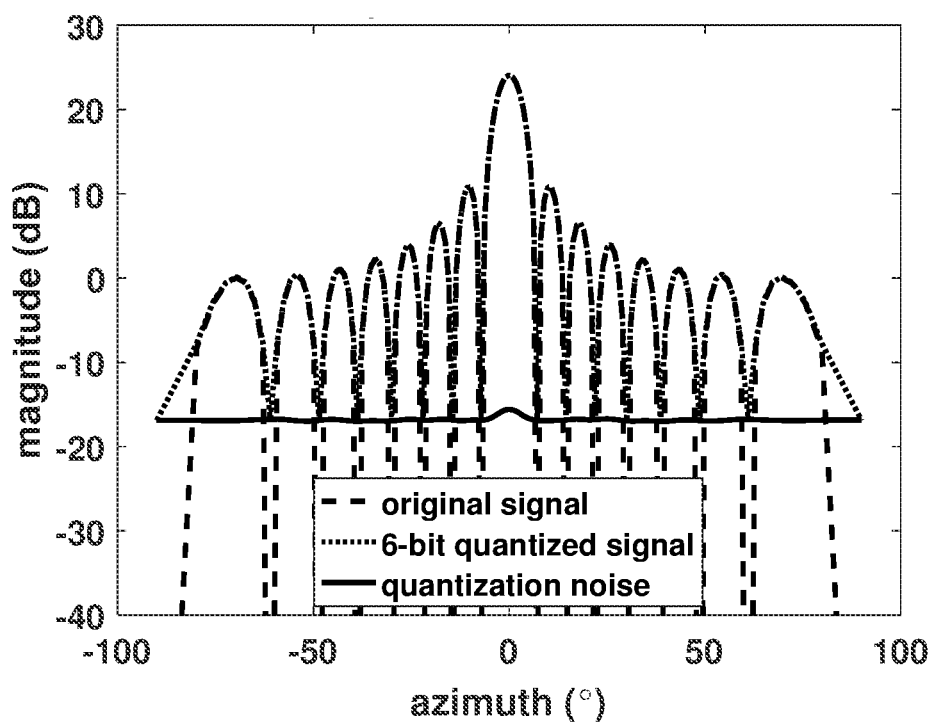
Figure 12:
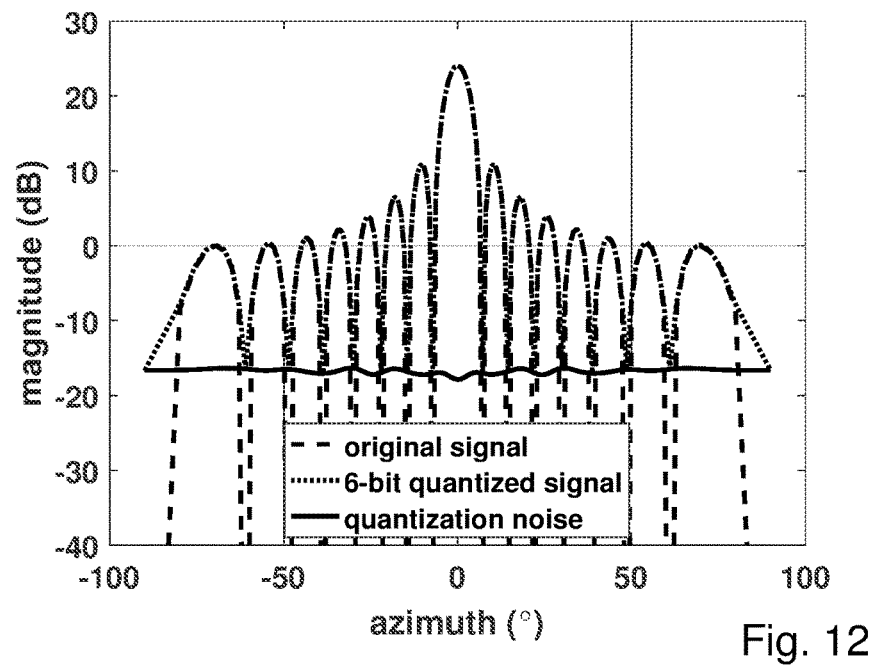
FIGS. 12-14 are Cartesian coordinate system showing signal magnitude as a function of viewing angle for signal and quantization noise according to three different embodiments.
Figure 13:
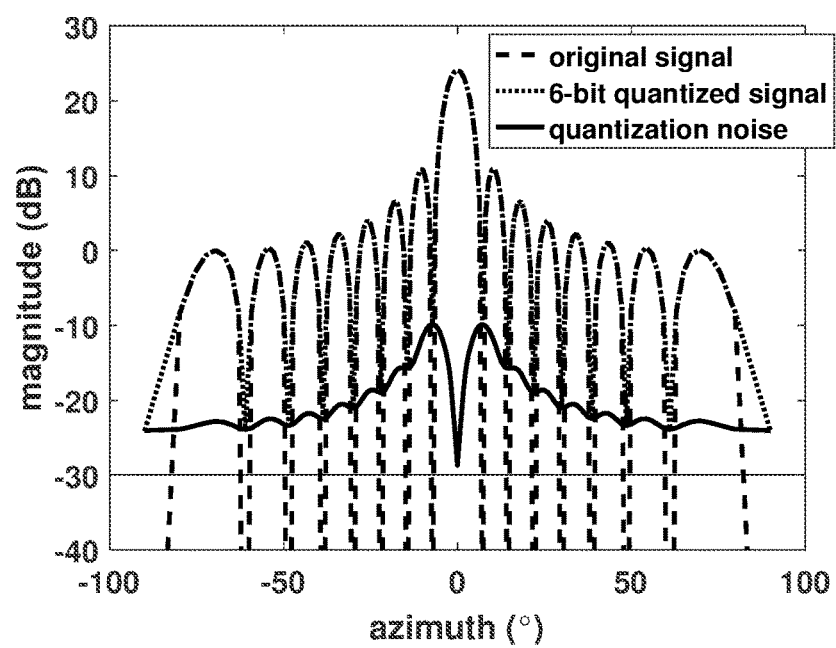
Figure 14:
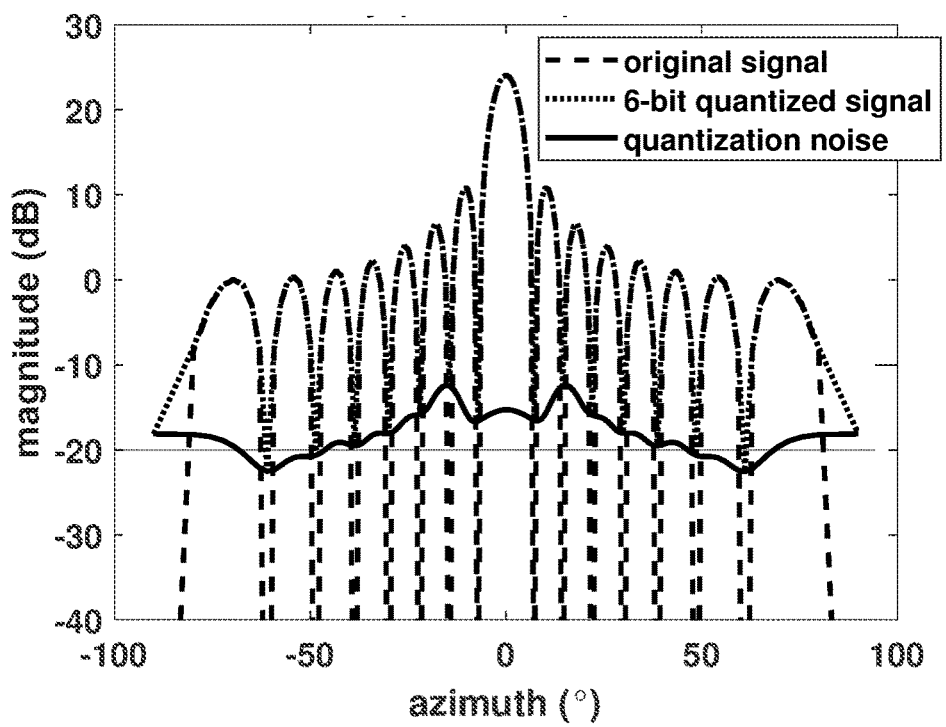

FIG. 9 shows an example without the invention, with a beam pointing towards a single-user in LOS at 0°. As can be seen, quantization noise has a peak coinciding with the direction towards the wireless communication device, which limits the SQNR to 31 dB in this case. FIGS. 10a and 10b show a similar result as FIGS. 2a and 2b but here the invention is applied using rotational transformation (and random phase modulation/demodulation). As can be seen, the SQNR spread is much smaller in FIG. 10 compared to FIG. 2. FIG. 11, FIG. 12 and FIG. 13 show the result when the invention is applied to the same case as in FIG. 9, using three different transformation methods: random rotation in FIG. 11, random translation in FIG. 12, and deterministic translation in FIG. 13. As can be seen in FIGS. 11 and 12, both random rotation and random translation distribute quantization noise evenly over all spatial directions. In FIG. 11, the SQNR in the main lobe, i.e. at 0° is 41.7 dB, and in FIG. 12, the SQNR is 43 dB at 0°. Deterministic translation on the other hand creates a dip in the quantization noise in the main lobe, i.e. in the direction towards the wireless communication device. In the main lobe direction, the three tested methods give an SQNR improvement of 11, 12, and 24 dB, respectively, compared with the case of FIG. 9 where the invention is not used. With 16 antenna elements, the array gain for signals is $10 \cdot \log_{10}(16)=12$ dB, which is achieved by the random translation method and almost achieved by random rotation. The deterministic translation method (linear offset step) achieves twice this gain in dB by moving quantization noise to other spatial directions. Another example of deterministic translation is shown in FIG. 14 where offsets are chosen among points on a circle with radius equal to one half quantization step. Here the SQNR improvement in the main direction is worse than the linear offset step but the improvement is available over a wider angular range. In the main direction, SQNR is similar to random translation but the quantization noise level follows the sidelobe level to some extent, which may be an advantage in some cases.

Figure 15:
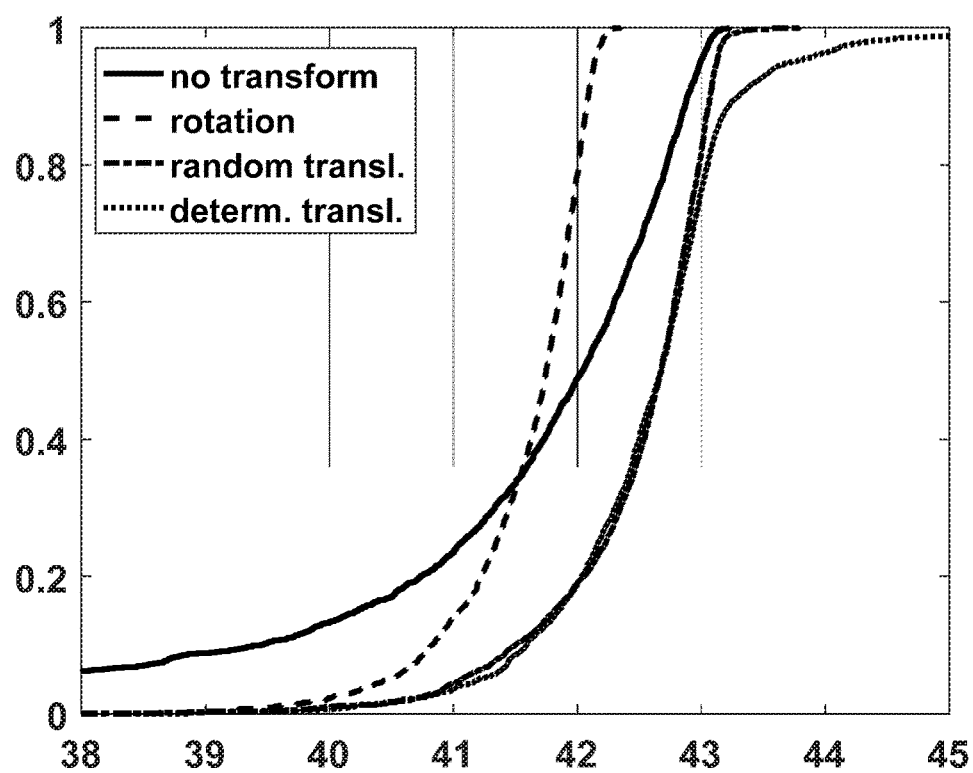
FIG. 15 is a Cartesian coordinate system showing a Cumulative Distribution Function (CDF) of the different embodiments of FIGS. 12-14.

FIG. 15 shows a comparison in cumulative distribution function (CDF) of SQNR in the compared cases of FIGS. 11, 12 and 13. Here, random translation performs approximately 1 dB better than random rotation but all tested transformations are effective in increasing the minimum SQNR compared to when no translation is used. Deterministic translation is similar to random translation up to approximately the $80^{th}$ percentile but gives improved SQNR after that.

Figure 16:
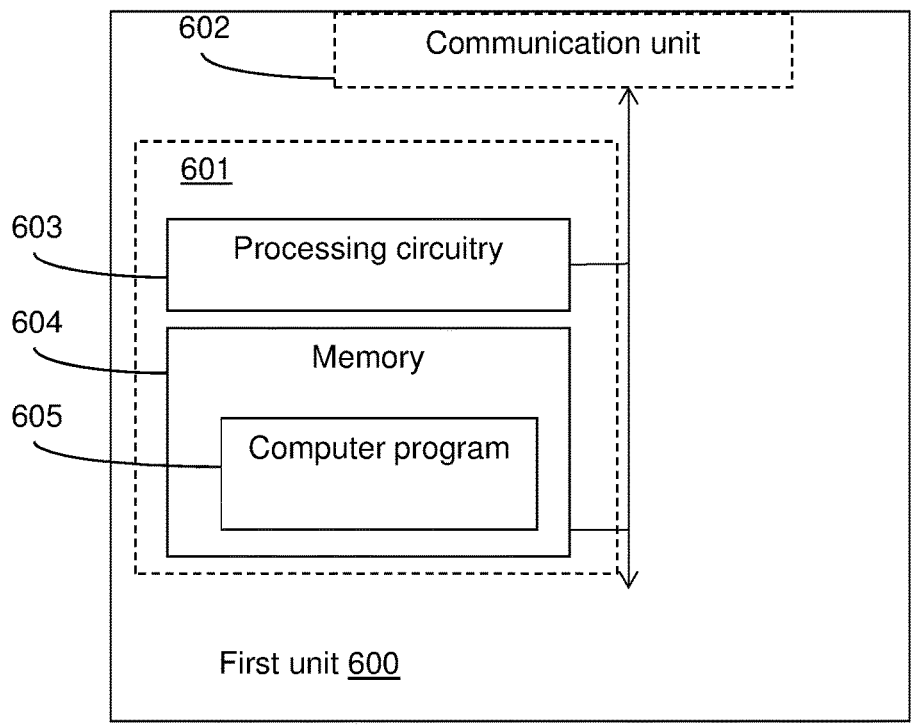
FIGS. 16-17 are schematic block diagrams of a more detailed first unit according to embodiments.

FIG. 16, in conjunction with FIG. 4, shows a first unit 600 operable in a base station system 100 of a wireless communication network, for handling antenna signals for transmission over a transmission connection 165 between the first unit and a second unit of the base station system. The base station system comprises a base unit 170 and a remote unit 160. The remote unit 160 is arranged to transmit the antenna signals wirelessly to, and receive from, one or more wireless communication devices 180. The antenna signals each comprises a plurality of IQ samples. The first unit is the base unit 170 and the second unit is the remote unit 160. Alternatively, the first unit is the remote unit 160 and the second unit is the base unit 170. The first unit 600 comprises a processing circuitry 603 and a memory 604. Said memory contains instructions executable by said processing circuitry, whereby the first unit 600 is operative for receiving IQ samples of a first antenna signal related to wireless communication of a first antenna 161 of the remote unit 160, and receiving IQ samples of a second antenna signal related to wireless communication of a second antenna 162 of the remote unit 160. The first unit 600 is further operative for transforming the received IQ samples of the first antenna signal into transformed IQ samples, using a first transformation value, and transforming the received IQ samples of the second antenna signal into transformed IQ samples, using a second transformation value, the second transformation value being different from the first transformation value. The first unit 600 is further operative for quantizing the transformed IQ samples of the first antenna signal using fewer bits than a first number of bits used for the received IQ samples of the first antenna signal, and quantizing the transformed IQ samples of the second antenna signal using fewer bits than a second number of bits used for the received IQ samples of the second antenna signal. The first unit 600 is further operative for transmitting the quantized and transformed IQ samples of the first and the second antenna signal over the transmission connection 165 to the second unit for subsequent de-quantizing and re-transforming of the quantized and transformed IQ samples of the first and the second antenna signal into the received IQ samples at the second unit.

According to an embodiment, the first unit 600 is operative for transforming the IQ samples of the first antenna by multiplying the IQ samples of the first antenna with the first transformation value, and operative for transforming the IQ samples of the second antenna by multiplying the IQ samples of the second antenna with the second transformation value.

According to another embodiment, the first unit 600 is operative for transforming the IQ samples of the first antenna by adding the IQ samples of the first antenna with the first transformation value, and operative for transforming the IQ samples of the second antenna by adding the IQ samples of the second antenna with the second transformation value.

According to another embodiment, the first unit 600 is operative for receiving N number of antenna signals, and the remote unit has N antennas, wherein the antenna signal n, where n=1, . . . , N, is related to wireless communication of antenna n of the remote unit, and operative for selecting the transformation values $a_n$ as the following sequence of transformation values:

$$a_n = \frac{\Delta}{N}\left\{-\frac{N}{2}, -\frac{N-1}{2}, \ldots, +\frac{N-1}{2}\right\} + i\frac{\Delta}{N}\left\{-\frac{N-1}{2}, +\frac{N-2}{2}, \ldots, -\frac{N}{2}\right\}, \text{ where } n = \{1, 2, \ldots, N\},$$

or operative for selecting the transformation values $a_n$ as a circular shift of the sequence of transformation values or as any other permutation of the sequence of transformation values.

According to another embodiment, the first transformation value and the second transformation value each comprises a first element and a second element. Further, the first unit is operative for transforming the IQ samples of the first antenna signal by multiplying the IQ samples of the first antenna signal with the first element of the first transformation value and thereafter adding the IQ samples of the first antenna signal with the second element of the first transformation value. Also, the first unit is operative for transforming the IQ samples of the second antenna signal by multiplying the IQ samples of the second antenna signal with the first element of the second transformation value and thereafter adding the IQ samples of the second antenna signal with the second element of the second transformation value.

According to another embodiment, the first unit 600 is further operative for selecting the first and the second transformation values based on beamforming coefficients and/or directions towards the one or more wireless communication devices 180 wirelessly connected to the remote unit 160, in order to provide a spectral dip for quantization noise towards the one or more wireless communication devices.

According to another embodiment, the first unit 600 is further operative for transmitting, to the second unit, information of the first transformation value and of the second transformation value.

According to another embodiment, the first unit 600 is further operative for updating over time the first transformation value and the second transformation value in a predefined pattern known by the first unit and the second unit.

According to other embodiments, the first unit 600 may further comprise a communication unit 602, which may be considered to comprise conventional means for communication with the second unit. In case the first unit is the remote unit 160, the communication unit 602 also comprises conventional means for wireless communication with the wireless communication devices 180, such as a transceiver for wireless transmission and reception. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the first unit 600 to perform the steps described in any of the described embodiments of the first unit 600 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity connected to the base station system 100, to which the first unit 600 has access via the communication unit 602. The computer program 605 may then be downloaded from the server into the memory 604.

Figure 17:
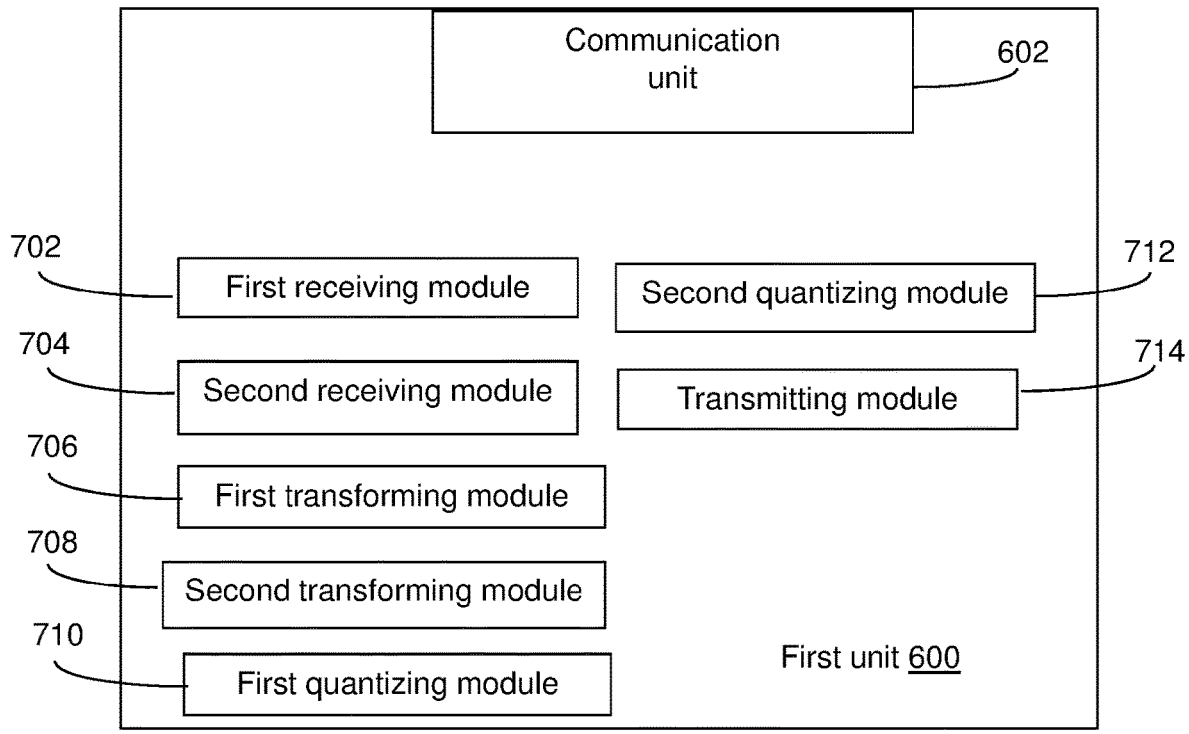

FIG. 17 shows another embodiment of a first unit 600 operable in a base station system 100 of a wireless communication network, for handling antenna signals for transmission over a transmission connection 165 between the first unit and a second unit of the base station system. The base station system comprises a base unit 170 and a remote unit 160, the remote unit 160 being arranged to transmit the antenna signals wirelessly to, and receive from, one or more wireless communication devices 180. The antenna signals each comprises a plurality of IQ samples. The first unit is the base unit 170 and the second unit is the remote unit 160, or the first unit is the remote unit 160 and the second unit is the base unit 170. The first unit 600 comprises a first receiving module 702 for receiving IQ samples of a first antenna signal related to wireless communication of a first antenna 161 of the remote unit 160 and a second receiving module 704 for receiving IQ samples of a second antenna signal related to wireless communication of a second antenna 162 of the remote unit 160. The first unit 600 further comprises a first transforming module 706 for transforming the received IQ samples of the first antenna signal into transformed IQ samples, using a first transformation value, and a second transforming module 708 for transforming the received IQ samples of the second antenna signal into transformed IQ samples, using a second transformation value, the second transformation value being different from the first transformation value. The first unit 600 further comprises a first quantizing module 710 for quantizing the transformed IQ samples of the first antenna signal using fewer bits than a first number of bits used for the received IQ samples of the first antenna signal, and a second quantizing module 712 for quantizing the transformed IQ samples of the second antenna signal using fewer bits than a second number of bits used for the received IQ samples of the second antenna signal, and a transmitting module 714 for transmitting the quantized and transformed IQ samples of the first and the second antenna signal over the transmission connection 165 to the second unit for subsequent de-quantizing and re-transforming of the quantized and transformed IQ samples of the first and the second antenna signal into the received IQ samples at the second unit. The first unit 600 may further comprise a communication unit 602 similar to the communication unit described in FIG. 16. In an embodiment, the modules of FIG. 17 are implemented as a computer program running on a processing circuitry, such as the processing circuitry 603 shown in FIG. 16.

Figure 18:
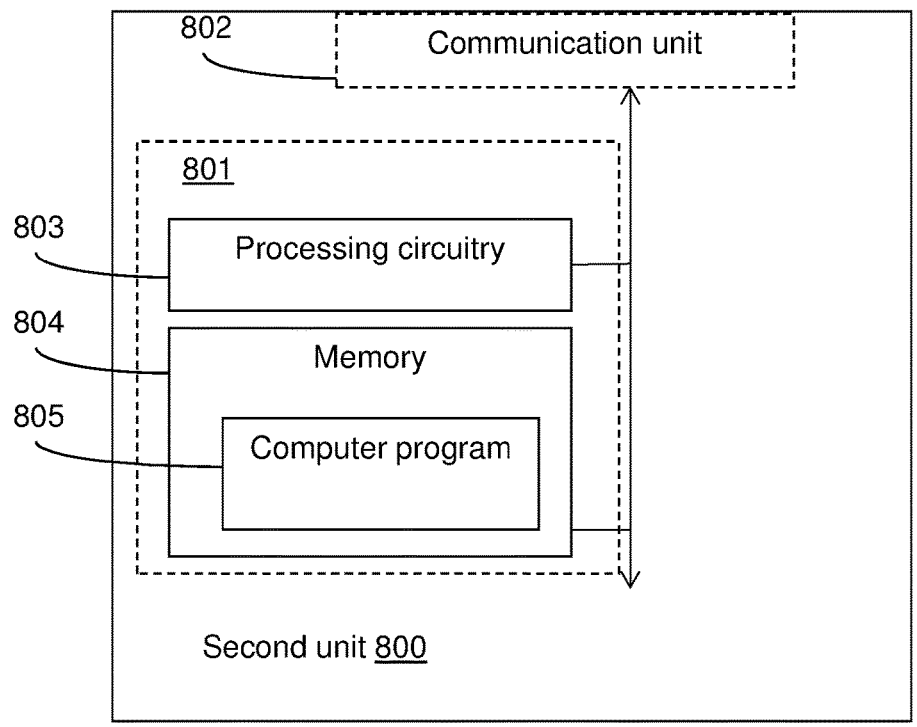
FIGS. 18-19 are schematic block diagrams of a more detailed second unit according to embodiments.

FIG. 18, in conjunction with FIG. 4, describes a second unit 800 operable in a base station system 100, for handling antenna signals for transmission over a transmission connection 165 between the second unit and a first unit of the base station system. The base station system comprises a base unit 170 and a remote unit 160, the remote unit 160 being arranged to transmit wireless signals to, and receive from, wireless communication devices 180. The antenna signals each comprises a plurality of IQ samples. The first unit is the base unit 170 and the second unit is the remote unit 160, or alternatively the first unit is the remote unit 160 and the second unit is the base unit 170. The second unit 800 comprises a processing circuitry 803 and a memory 804. Said memory contains instructions executable by said processing circuitry, whereby the second unit 800 is operative for receiving, from the first unit, IQ samples of a first antenna signal related to wireless communication of a first antenna 161 of the remote unit 160, wherein the received IQ samples have been transformed using a first transformation value and the transformed IQ samples have been quantized, and receiving, from the first unit, IQ samples of a second antenna signal related to wireless communication of a second antenna 162 of the remote unit 160, wherein the received IQ samples of the second antenna signal have been transformed using a second transformation value and the transformed IQ samples have been quantized, the second transformation value being different from the first transformation value. The second unit 800 is further operative for de-quantizing the received IQ samples of the first antenna signal to a format using more bits than a number of bits used for the quantized IQ samples of the received first antenna signal, and de-quantizing the received IQ samples of the second antenna signal to a format using more bits than a number of bits used for the quantized IQ samples of the received second antenna signal. The second unit 800 is further operative for re-transforming the de-quantized IQ samples of the first antenna signal using the inverse of the first transformation value, and re-transforming the de-quantized IQ samples of the second antenna signal using the inverse of the second transformation value.

According to an embodiment, the IQ samples of the first antenna signal were transformed by being multiplied with the first transformation value and the IQ samples of the second antenna signal were transformed by being multiplied with the second transformation value. Further, the second unit is operative for re-transform ing the de-quantized first antenna signal by dividing the IQ samples of the first antenna signal with the first transformation value, and the second unit is further operative for re-transforming the de-quantized second antenna signal by dividing the IQ samples of the second antenna signal with the second transformation value.

According to an embodiment, the IQ samples of the first antenna signal were transformed by being added with the first transformation value and the IQ samples of the second antenna signal were transformed by being added with the second transformation value. Further, the second unit is operative for re-transform ing the de-quantized first antenna signal by subtracting the IQ samples of the first antenna signal with the first transformation value, and the second unit is further operative for re-transforming the de-quantized second antenna signal by subtracting the IQ samples of the second antenna signal with the second transformation value.

According to an embodiment, the second unit 800 is further operative for receiving, from the first unit, information of the first transformation value and of the second transformation value.

According to other embodiments, the second unit 800 may further comprise a communication unit 802, which may be considered to comprise conventional means for communication with the first unit. In case the second unit is the remote unit 160, the communication unit 802 also comprises conventional means for wireless communication with the wireless communication devices 180, such as a transceiver for wireless transmission and reception. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the second unit 800 to perform the steps described in any of the described embodiments of the second unit 800 and its method. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity connected to the base station system 100, to which the second unit 800 has access via the communication unit 802. The computer program 805 may then be downloaded from the server into the memory 804.

Figure 19:
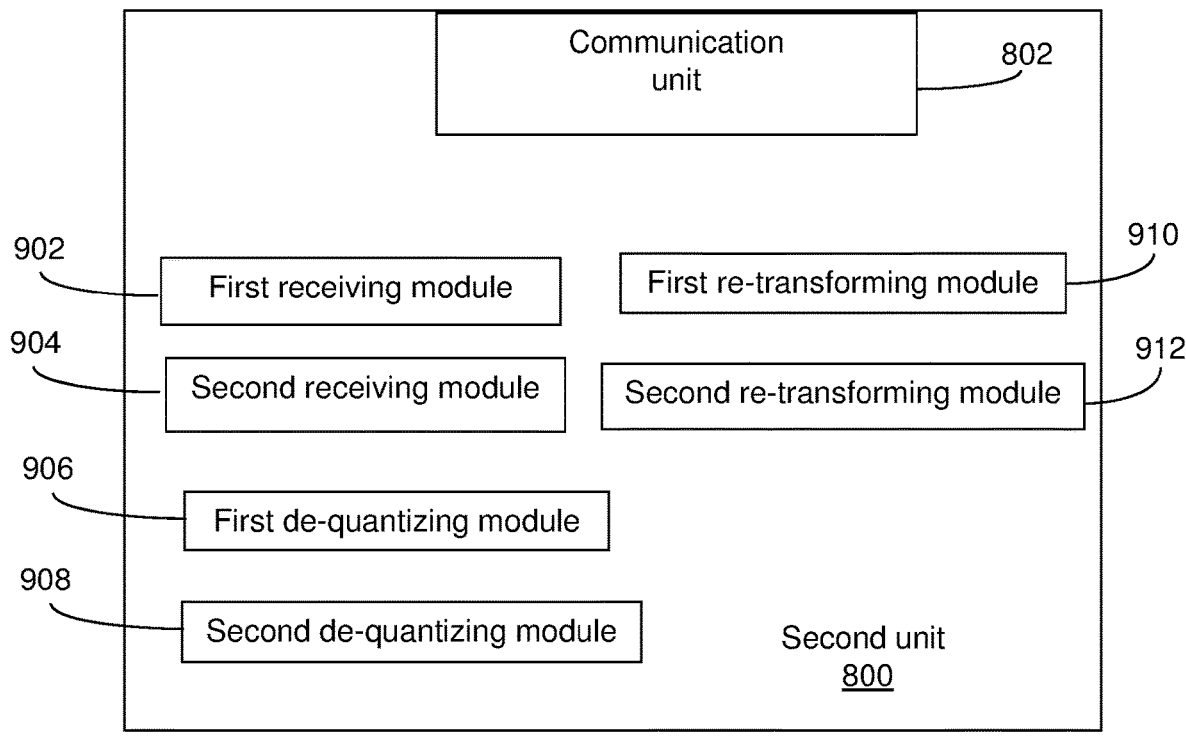

FIG. 19, in conjunction with FIG. 4, describes an alternative embodiment of a second unit 800. The second unit 800 is operable in a base station system 100, for handling antenna signals for transmission over a transmission connection 165 between the second unit and a first unit of the base station system. The base station system comprises a base unit 170 and a remote unit 160, the remote unit 160 being arranged to transmit wireless signals to, and receive from, wireless communication devices 180. The antenna signals each comprises a plurality of IQ samples. The first unit is the base unit 170 and the second unit is the remote unit 160, or alternatively the first unit is the remote unit 160 and the second unit is the base unit 170. The second unit 800 comprises a first receiving module 902 for receiving, from the first unit, IQ samples of a first antenna signal related to wireless communication of a first antenna 161 of the remote unit 160, wherein the received IQ samples have been transformed using a first transformation value and the transformed IQ samples have been quantized, and a second receiving module 904 for receiving, from the first unit, IQ samples of a second antenna signal related to wireless communication of a second antenna 162 of the remote unit 160, wherein the received IQ samples of the second antenna signal have been transformed using a second transformation value and the transformed IQ samples have been quantized, the second transformation value being different from the first transformation value. The second unit 800 further comprises a first de-quantizing module 906 for de-quantizing the received IQ samples of the first antenna signal to a format using more bits than a number of bits used for the quantized IQ samples of the received first antenna signal, and a second de-quantizing module 908 for de-quantizing the received IQ samples of the second antenna signal to a format using more bits than a number of bits used for the quantized IQ samples of the received second antenna signal. The second unit 800 further comprises a first re-transforming module 910 for re-transforming the de-quantized IQ samples of the first antenna signal using the inverse of the first transformation value, and a second re-transforming module 912 for re-transforming the de-quantized IQ samples of the second antenna signal using the inverse of the second transformation value. The second unit 800 may further comprise a communication unit 802 similar to the communication unit described in FIG. 18. In an embodiment, the modules of FIG. 19 are implemented as a computer program running on a processing circuitry, such as the processing circuitry 803 shown in FIG. 18.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a first unit of a base station system of a wireless communication network, for handling antenna signals for transmission over a transmission connection between the first unit and a second unit of the base station system, the base station system comprising a base unit and a remote unit, the remote unit being arranged to transmit the antenna signals wirelessly to, and receive from, one or more wireless communication devices, the antenna signals each comprising a plurality of In-phase and Quadrature (IQ) samples, wherein the first unit is the base unit and the second unit is the remote unit, or wherein the first unit is the remote unit and the second unit is the base unit, the method comprising:

receiving IQ samples of a first antenna signal related to wireless communication of a first antenna of the remote unit;

receiving IQ samples of a second antenna signal related to wireless communication of a second antenna of the remote unit;

transforming the received IQ samples of the first antenna signal into transformed IQ samples, using a first transformation value;

transforming the received IQ samples of the second antenna signal into transformed IQ samples, using a second transformation value, the second transformation value being different from the first transformation value;

quantizing the transformed IQ samples of the first antenna signal using fewer bits than a first number of bits used for the received IQ samples of the first antenna signal;

quantizing the transformed IQ samples of the second antenna signal using fewer bits than a second number of bits used for the received IQ samples of the second antenna signal; and transmitting the quantized and transformed IQ samples of the first and the second antenna signal over the transmission connection to the second unit for subsequent de-quantizing and re-transforming of the quantized and transformed IQ samples of the first and the second antenna signal into the received IQ samples at the second unit.

2. The method according to claim 1, wherein the IQ samples of the first antenna signal are transformed by being multiplied with the first transformation value, and the IQ samples of the second antenna signal are transformed by being multiplied with the second transformation value.

3. The method according to claim 2, wherein the first transformation value and the second transformation value are real values.

4. The method according to claim 2, wherein the first transformation value and the second transformation value are complex values, and the first transformation value is multiplied with the IQ samples of the first antenna signal and the second transformation value is multiplied with the IQ samples of the second antenna signal.

5. The method according to claim 1, wherein the IQ samples of the first antenna signal are transformed by being added with the first transformation value, and the IQ samples of the second antenna signal are transformed by being added with the second transformation value.

6. The method according to claim 5, wherein a number of antenna signals (N) are received, and the remote unit has N antennas, wherein the antenna signal n, where n=1, . . . , N, is related to wireless communication of antenna n of the remote unit, and wherein the transformation values $a_n$ are selected as the following sequence of transformation values:

$$a_n = \frac{\Delta}{N}\left\{-\frac{N}{2}, -\frac{N-1}{2}, \ldots, +\frac{N-1}{2}\right\} + i\frac{\Delta}{N}\left\{+\frac{N-1}{2}, +\frac{N-2}{2}, \ldots, -\frac{N}{2}\right\}, \text{ where } n = \{1, 2, \ldots, N\},$$

or the transformation values are selected as a circular shift of the sequence of transformation values or as any other permutation of the sequence of transformation values.

7. The method according to claim 1, wherein the first transformation value and the second transformation value each comprises a first element and a second element, wherein the IQ samples of the first antenna signal are transformed by being multiplied with the first element of the first transformation value and thereafter being added with the second element of the first transformation value, and the IQ samples of the second antenna signal are transformed by being multiplied with the first element of the second transformation value and thereafter being added with the second element of the second transformation value.

8. The method according to claim 1, further comprising:
selecting the first and the second transformation values based on beamforming coefficients and/or directions towards the one or more wireless communication devices wirelessly connected to the remote unit, in order to provide a spectral dip for quantization noise towards the one or more wireless communication devices.

9. The method according to claim 1, further comprising:
transmitting, to the second unit, information of the first transformation value and of the second transformation value.

10. The method according to claim 1, further comprising updating over time the first transformation value and the second transformation value in a predefined pattern known by the first unit and the second unit.

11. A method performed by a second unit of a base station system of a wireless communication network, for handling antenna signals for transmission over a transmission connection between the second unit and a first unit of the base station system, the base station system comprising a base unit and a remote unit, the remote unit being arranged to transmit wireless signals to, and receive from, wireless communication devices, the antenna signals each comprising a plurality of In-phase and Quadrature (IQ) samples, wherein the first unit is the base unit and the second unit is the remote unit, or wherein the first unit is the remote unit and the second unit is the base unit, the method comprising:
receiving, from the first unit, IQ samples of a first antenna signal related to wireless communication of a first antenna of the remote unit, wherein the received IQ samples have been transformed using a first transformation value and the transformed IQ samples have been quantized;
receiving, from the first unit, IQ samples of a second antenna signal related to wireless communication of a second antenna of the remote unit, wherein the received IQ samples of the second antenna signal have been transformed using a second transformation value and the transformed IQ samples have been quantized, the second transformation value being different from the first transformation value;
de-quantizing the received IQ samples of the first antenna signal to a format using more bits than a number of bits used for the quantized IQ samples of the received first antenna signal;
de-quantizing the received IQ samples of the second antenna signal to a format using more bits than a number of bits used for the quantized IQ samples of the received second antenna signal;
re-transforming the de-quantized IQ samples of the first antenna signal using the inverse of the first transformation value; and
re-transforming the de-quantized IQ samples of the second antenna signal using the inverse of the second transformation value.

12. The method according to claim 11, wherein the IQ samples of the first antenna signal were transformed by being multiplied with the first transformation value and the IQ samples of the second antenna signal were transformed by being multiplied with the second transformation value, and wherein the re-transforming of the de-quantized first antenna signal comprises dividing the IQ samples of the first antenna signal with the first transformation value, and wherein the re-transforming of the de-quantized second antenna signal comprises dividing the IQ samples of the second antenna signal with the second transformation value.

13. The method according to claim 12, wherein the first transformation value and the second transformation value are real values.

14. The method according to claim 12, wherein the first transformation value and the second transformation value are complex values, and wherein the re-transforming of the de-quantized first antenna signal comprises multiplying the IQ samples of the first antenna signal with the complex conjugate of the first transformation value, and wherein the re-transforming of the de-quantized second antenna signal comprises multiplying the IQ samples of the second antenna signal with the complex conjugate of the second transformation value.

15. The method according to claim 11, wherein the IQ samples of the first antenna signal were transformed by being added with the first transformation value and the IQ samples of the second antenna signal were transformed by being added with the second transformation value, and wherein the re-transforming of the de-quantized first antenna signal comprises subtracting the IQ samples of the first antenna signal with the first transformation value, and wherein the re-transforming of the de-quantized second antenna signal comprises subtracting the IQ samples of the second antenna signal with the second transformation value.

16. The method according to claim 11, further comprising:
receiving, from the first unit, information of the first transformation value and of the second transformation value.

17. The method according to claim 11, further comprising updating over time the first transformation value and the second transformation value in a predefined pattern known by the first unit and the second unit.

18. A first unit operable in a base station system of a wireless communication network, for handling antenna signals for transmission over a transmission connection between the first unit and a second unit of the base station system, the base station system comprising a base unit and a remote unit, the remote unit being arranged to transmit the antenna signals wirelessly to, and receive from, one or more wireless communication devices, the antenna signals each comprising a plurality of In-phase and Quadrature (IQ) samples, wherein the first unit is the base unit and the second unit is the remote unit, or wherein the first unit is the remote unit and the second unit is the base unit, wherein the first unit comprises a processing circuitry and a memory, said memory containing instructions executable by said processing circuitry, whereby the first unit is operative for:
receiving IQ samples of a first antenna signal related to wireless communication of a first antenna of the remote unit;

receiving IQ samples of a second antenna signal related to wireless communication of a second antenna of the remote unit;

transforming the received IQ samples of the first antenna signal into transformed IQ samples, using a first transformation value;

transforming the received IQ samples of the second antenna signal into transformed IQ samples, using a second transformation value, the second transformation value being different from the first transformation value;

quantizing the transformed IQ samples of the first antenna signal using fewer bits than a first number of bits used for the received IQ samples of the first antenna signal;

quantizing the transformed IQ samples of the second antenna signal using fewer bits than a second number of bits used for the received IQ samples of the second antenna signal; and transmitting the quantized and transformed IQ samples of the first and the second antenna signal over the transmission connection to the second unit for subsequent de-quantizing and re-transforming of the quantized and transformed IQ samples of the first and the second antenna signal into the received IQ samples at the second unit.

19. The first unit according to claim 18, operative for transforming the IQ samples of the first antenna by multiplying the IQ samples of the first antenna with the first transformation value, and operative for transforming the IQ samples of the second antenna by multiplying the IQ samples of the second antenna with the second transformation value.

20. A second unit operable in a base station system, for handling antenna signals for transmission over a transmission connection between the second unit and a first unit of the base station system, the base station system comprising a base unit and a remote unit, the remote unit being arranged to transmit wireless signals to, and receive from, wireless communication devices, the antenna signals each comprising a plurality of In-phase and Quadrature (IQ) samples, wherein the first unit is the base unit and the second unit is the remote unit, or wherein the first unit is the remote unit and the second unit is the base unit, the second unit comprising a processing circuitry and a memory, said memory containing instructions executable by said processing circuitry, whereby the second unit is operative for:

receiving, from the first unit, IQ samples of a first antenna signal related to wireless communication of a first antenna of the remote unit, wherein the received IQ samples have been transformed using a first transformation value and the transformed IQ samples have been quantized;

receiving, from the first unit, IQ samples of a second antenna signal related to wireless communication of a second antenna of the remote unit, wherein the received IQ samples of the second antenna signal have been transformed using a second transformation value and the transformed IQ samples have been quantized, the second transformation value being different from the first transformation value;

de-quantizing the received IQ samples of the first antenna signal to a format using more bits than a number of bits used for the quantized IQ samples of the received first antenna signal;

de-quantizing the received IQ samples of the second antenna signal to a format using more bits than a number of bits used for the quantized IQ samples of the received second antenna signal;

re-transforming the de-quantized IQ samples of the first antenna signal using the inverse of the first transformation value; and re-transforming the de-quantized IQ samples of the second antenna signal using the inverse of the second transformation value.

\* \* \* \* \*